United States Patent
Sidana et al.

(10) Patent No.: US 10,652,216 B2
(45) Date of Patent: *May 12, 2020

(54) SYSTEMS AND PROCESSES FOR EXECUTING PRIVATE PROGRAMS ON UNTRUSTED COMPUTERS

(71) Applicant: Baffle, Inc., Santa Clara, CA (US)

(72) Inventors: Ashmeet Sidana, Palo Alto, CA (US);
Priyadarshan Kolte, Austin, TX (US);
Calvin Lin, Austin, TX (US)

(73) Assignee: Baffle, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,212

(22) Filed: Sep. 28, 2018

(65) Prior Publication Data
US 2019/0044915 A1  Feb. 7, 2019

Related U.S. Application Data

(63) Continuation of application No. 14/804,713, filed on Jul. 21, 2015, now Pat. No. 10,110,566.

(51) Int. Cl.
| | |
|---|---|
| *H04L 29/06* | (2006.01) |
| *G06F 21/14* | (2013.01) |
| *H04L 9/00* | (2006.01) |
| *H04L 29/08* | (2006.01) |

(52) U.S. Cl.
CPC .......... *H04L 63/0407* (2013.01); *G06F 21/14* (2013.01); *H04L 9/008* (2013.01); *H04L 67/104* (2013.01); *H04L 63/0428* (2013.01); *H04L 63/18* (2013.01); *H04L 2209/046* (2013.01); *H04L 2209/12* (2013.01); *H04L 2209/16* (2013.01)

(58) Field of Classification Search
CPC ... H04L 63/0407; H04L 9/008; H04L 67/104; H04L 63/18; H04L 2209/046; H04L 2209/16; H04L 63/0428; H04L 2209/12
See application file for complete search history.

(56) References Cited

U.S. PATENT DOCUMENTS

| | | | |
|---|---|---|---|
| 6,067,620 A | 5/2000 | Holden et al. | |
| 6,314,520 B1 | 11/2001 | Schell et al. | |
| 7,353,499 B2 * | 4/2008 | de Jong | G06F 21/10 |
| | | | 713/190 |
| 7,430,670 B1 | 9/2008 | Horning et al. | |
| 8,171,306 B2 | 5/2012 | Venkatesan et al. | |
| 8,312,518 B1 | 5/2012 | Ezell | |

(Continued)

FOREIGN PATENT DOCUMENTS

| | | |
|---|---|---|
| CN | 103559458 A | 2/2014 |
| CN | 104243166 A | 12/2014 |

OTHER PUBLICATIONS

"Homomorphic Encryption", http//en.wikipedia.org/wiki/Homomorphic_encrypion.

(Continued)

*Primary Examiner* — J. Brant Murphy
*Assistant Examiner* — Stephen T Gundry
(74) *Attorney, Agent, or Firm* — BakerHostetler

(57) ABSTRACT

The present invention provides methods for executing a private computer program on untrusted computers. The present invention also provides for products produced by the methods of the present invention and for apparatuses used to perform the methods of the present invention.

50 Claims, 19 Drawing Sheets

(56) References Cited

U.S. PATENT DOCUMENTS

| | | | |
|---|---|---|---|
| 8,220,058 B2* | 7/2012 | de Jong | G06F 21/14 |
| | | | 726/26 |
| 8,347,398 B1 | 1/2013 | Weber | |
| 8,601,498 B2* | 12/2013 | Laurich | G06F 21/602 |
| | | | 719/326 |
| 8,656,482 B1 | 2/2014 | Tosa | |
| 8,681,973 B2 | 3/2014 | Weinman | |
| 8,700,915 B2 | 4/2014 | Michiels et al. | |
| 8,762,736 B1 | 6/2014 | Goldwasser et al. | |
| 8,762,964 B2 | 6/2014 | Turner et al. | |
| 8,862,895 B2 | 10/2014 | Rieffel et al. | |
| 8,909,967 B1 | 12/2014 | van Dijk | |
| 9,055,038 B1 | 6/2015 | Lu et al. | |
| 9,077,525 B2* | 7/2015 | Chandran | H04L 9/088 |
| 9,124,650 B2 | 9/2015 | Maharajh et al. | |
| 9,361,456 B2* | 6/2016 | Heng | G06F 21/552 |
| 9,380,037 B2 | 6/2016 | Parann-Nissany et al. | |
| 9,411,976 B2* | 8/2016 | Irvine | G06F 21/6218 |
| 9,424,421 B2 | 8/2016 | Aissi et al. | |
| 9,477,845 B2 | 10/2016 | Boivie et al. | |
| 9,495,544 B2* | 11/2016 | Aissi | G06F 21/60 |
| 9,503,268 B2* | 11/2016 | Brandwine | H04L 9/3263 |
| 9,521,126 B2 | 12/2016 | Yarvis et al. | |
| 9,584,517 B1 | 2/2017 | Roth et al. | |
| 9,589,128 B2* | 3/2017 | Baentsch | G06F 9/4401 |
| 9,596,263 B1 | 3/2017 | Brooker | |
| 9,712,503 B1 | 7/2017 | Ahmed et al. | |
| 9,753,931 B2 | 9/2017 | Burshteyn | |
| 9,813,245 B2 | 11/2017 | Le Saint et al. | |
| 9,898,473 B2 | 2/2018 | Burshteyn | |
| 9,928,102 B2 | 3/2018 | Majumdar et al. | |
| 9,942,034 B2 | 4/2018 | Le Saint et al. | |
| 2001/0037450 A1* | 11/2001 | Metlitski | G06F 12/1408 |
| | | | 713/152 |
| 2003/0018608 A1 | 1/2003 | Rice et al. | |
| 2003/0177374 A1 | 9/2003 | Yung et al. | |
| 2005/0069131 A1* | 3/2005 | de Jong | G06F 21/14 |
| | | | 380/239 |
| 2005/0069138 A1* | 3/2005 | de Jong | G06F 9/3017 |
| | | | 380/278 |
| 2005/0071653 A1* | 3/2005 | de Jong | G06F 21/125 |
| | | | 713/189 |
| 2005/0071655 A1* | 3/2005 | de Jong | G06F 21/125 |
| | | | 713/190 |
| 2006/0259744 A1 | 11/2006 | Matthes | |
| 2009/0249492 A1* | 10/2009 | Boesgaard Sorensen | |
| | | | G06F 21/556 |
| | | | 726/27 |
| 2009/0287921 A1 | 11/2009 | Zhu | |
| 2010/0115260 A1 | 5/2010 | Venkatesan et al. | |
| 2011/0167490 A1 | 7/2011 | Yung et al. | |
| 2011/0202765 A1* | 8/2011 | McGrane | G06F 21/53 |
| | | | 713/168 |
| 2011/0202916 A1* | 8/2011 | VoBa | G06F 21/62 |
| | | | 718/1 |
| 2011/0296164 A1 | 12/2011 | Boebert et al. | |
| 2011/0296440 A1 | 12/2011 | Laurich et al. | |
| 2012/0066510 A1 | 3/2012 | Weinman | |
| 2012/0084544 A1 | 4/2012 | Farina et al. | |
| 2012/0179916 A1 | 7/2012 | Staker et al. | |
| 2012/0185946 A1 | 7/2012 | Kamara | |
| 2012/0198514 A1 | 8/2012 | McCune et al. | |
| 2012/0278897 A1 | 11/2012 | Ang et al. | |
| 2012/0331283 A1 | 12/2012 | Chandran et al. | |
| 2013/0019092 A1 | 1/2013 | Levow | |
| 2013/0160133 A1 | 6/2013 | Avgerinos et al. | |
| 2013/0179685 A1 | 7/2013 | Weinstein et al. | |
| 2013/0247230 A1 | 9/2013 | Parann-Nissany et al. | |
| 2014/0053245 A1* | 2/2014 | Tosa | H04L 63/08 |
| | | | 726/4 |
| 2014/0108726 A1* | 4/2014 | Laurich | G06F 21/602 |
| | | | 711/114 |
| 2014/0115702 A1 | 4/2014 | Li et al. | |
| 2014/0119540 A1 | 5/2014 | Pearson et al. | |
| 2014/0173263 A1 | 6/2014 | Pfeifer, Jr. et al. | |
| 2014/0195804 A1 | 7/2014 | Hursti | |
| 2014/0208096 A1 | 7/2014 | Brandwine et al. | |
| 2014/0208097 A1 | 7/2014 | Brandwine et al. | |
| 2014/0237614 A1 | 8/2014 | Irvine | |
| 2014/0298452 A1 | 10/2014 | Heng et al. | |
| 2014/0298453 A1 | 10/2014 | Heng et al. | |
| 2014/0298454 A1 | 10/2014 | Heng et al. | |
| 2014/0380311 A1 | 12/2014 | Deng et al. | |
| 2015/0007265 A1 | 1/2015 | Aissi et al. | |
| 2015/0058629 A1 | 2/2015 | Yarvis et al. | |
| 2015/0067330 A1 | 3/2015 | Khan et al. | |
| 2015/0089589 A1 | 3/2015 | Cucinotta et al. | |
| 2015/0294115 A1* | 10/2015 | O'Hare | G06F 21/53 |
| | | | 726/26 |
| 2015/0294117 A1 | 10/2015 | Cucinotta et al. | |
| 2015/0317472 A1 | 11/2015 | Baentsch et al. | |
| 2015/0324590 A1 | 11/2015 | Krten et al. | |
| 2015/0339788 A1 | 11/2015 | Dawson | |
| 2015/0372811 A1 | 12/2015 | Le Saint et al. | |
| 2016/0065370 A1 | 3/2016 | Le Saint et al. | |
| 2016/0085992 A1 | 3/2016 | Boivie et al. | |
| 2016/0112203 A1 | 4/2016 | Thom et al. | |
| 2016/0171212 A1 | 6/2016 | Majumdar et al. | |
| 2016/0241389 A1 | 8/2016 | Le Saint et al. | |
| 2016/0261404 A1 | 9/2016 | Ford et al. | |
| 2016/0294794 A1 | 10/2016 | Mancic et al. | |
| 2016/0306966 A1 | 10/2016 | Srivastava et al. | |
| 2016/0342608 A1 | 11/2016 | Burshteyn | |
| 2017/0005788 A1* | 1/2017 | Irvine | G06F 21/6218 |
| 2017/0005990 A1 | 1/2017 | Birger et al. | |
| 2017/0063809 A1* | 3/2017 | Aissi | G06F 21/60 |
| 2017/0286669 A1 | 10/2017 | OHare et al. | |
| 2017/0357658 A1 | 12/2017 | Burshteyn | |
| 2018/0026787 A1 | 1/2018 | Le Saint et al. | |
| 2018/0089414 A1 | 3/2018 | Baentsch et al. | |
| 2018/0089415 A1 | 3/2018 | Baentsch et al. | |

OTHER PUBLICATIONS

Baumann, et al., "Shielding Applications From an Untrusted Cloud with Haven", 11th USENIX Symposium on Operating Systems Design and Implementation (OSOI 14), Oct. 2014, 19 pgs.

Brun, et al., "Entrusting Private Computation and Data to Untrusted Networks", IEEE Transactions on Dependable and Secure Computing, vol. 10(4), Jul./Aug. 2013, 225-238.

Brun, et al., "Keeping Data Private While Computing in the Cloud", IEEE, 2012, 285-294.

Collberg et al., "Surreptitious Software: Obfuscation, Watermarking, and Tamperproofing for Software Protection", Addison-Wesley Professional, Jun. 15, 2009, 53 pgs.

Cybernetica, "Security Technology", https://cyber.ee/en/security-technologies/sharemindi, 2015, accessed Nov. 2, 2015, 2 pgs.

Dyadic, "Protect the Keys to Everything", https://www.dyadicsec.com/technoloqyi, 2015, accessed Nov. 2, 2015, 4 pgs.

Factor, et al., "JavaSplit: A Runtime for Execution of Monolithic Java Programs on Heterogeneous Collections of Commodity Workstations", IEEE International Conference on Cluster Computing, 2003, 26 pgs.

Galois, "Research and Development", https:iigalois.com/team/david-archer/2015, accessed Nov. 2, 2015, 2 pgs.

Kryptnostic, "Our Technology", https://www.kryptnostic.com/technology, 2015, accessed Nov. 2, 2015, 3pgs.

Tetali, et al., "MrCrypt: Static Analysis for Secure Cloud Computations", Oopsla, Oct. 2013, 16 pages.

Tople, et al., "Autocrypt: Enabling Homomorphic Computation on Servers to Protect Sensitive Web Content", ACM CCS,13(4-8), 2013, 14 pgs.

Ng, Protecting Mobile Agents Against Malicious Hosts, Jun. 2000, pp. 1-112.

* cited by examiner

SYSTEMS AND PROCESSES FOR EXECUTING PRIVATE PROGRAMS ON UNTRUSTED COMPUTERS

CROSS-REFERENCE TO RELATED APPLICATION

This application is a continuation application of U.S. patent application Ser. No. 14/804,713, "Systems and Processes for Executing Private Programs on Untrusted Computers", filed on Jul. 21, 2015. The entirety of which is incorporated by reference herein for all purposes.

FIELD OF THE INVENTION

The disclosed invention is in the field of computing security.

BACKGROUND OF THE INVENTION

Security in remote computer program execution is a continuous battle, especially with the recent surge in cloud networks and expanded enterprise networks, allowing users unfettered access to large networks of computers. The combined power and speed of program execution on multiple computers is advantageous, but may also be subject to prying eyes. Any or all of the remote computers may be under the control of a malicious user or attacker, compromising precious confidential information.

Thus, there is a need for a method and system to execute a program on an untrusted computer, or plurality of computers, such that the executing program and data is kept private from an attacker that has complete access to the untrusted computer(s). The invention is directed to these and other important needs.

SUMMARY OF THE INVENTION

The present invention provides methods for executing a computer program comprising: dividing a computer program into a series of operations, the computer program being on a trusted computer connected to at least one other computer; sending each operation of the series of operations with accompanying instructions to the at least one other computer, the accompanying instructions operative to compute a result of the respective operation and forward the result to another computer; and receiving, at the trusted computer, a computed outcome of the computer program.

The present invention also provides systems for executing a computer program. The system may comprise at least one trusted computer communicatively connected to at least one other computer. A first trusted computer of the at least one trusted computer may have computer instructions stored thereon that, during execution, cause the system to perform operations comprising a program execution process. The process may include dividing a computer program on the first trusted computer into a series of operations, sending each operation of the series of operations with accompanying instructions to the at least one other computer, wherein the accompanying instructions operate to compute a result of the respective operation and forward the result to another computer, and receiving, at the first trusted computer, a computed outcome of the computer program.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
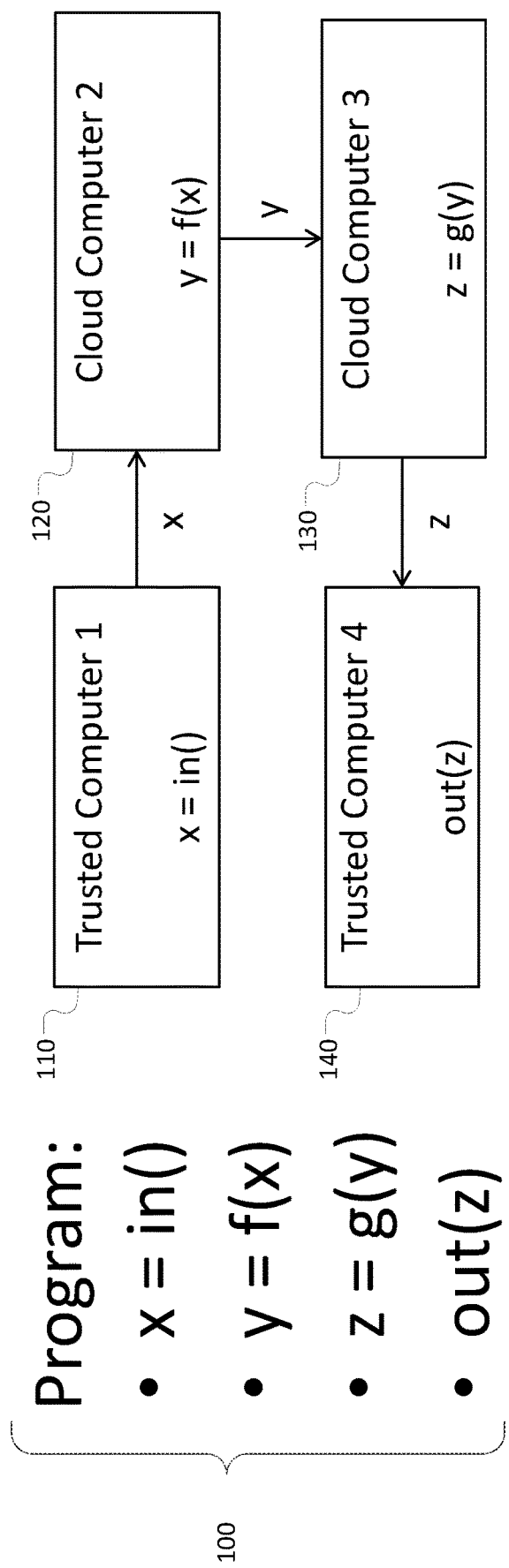
FIG. 1 illustrates an embodiment of the present invention directed to shredding a program across networked computers.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

The solution disclosed herein includes a method for executing a computer program on a trusted computer networked to at least one other computer and a system capable of performing that method. The method includes: dividing the computer program into a series of operations; sending each operation of the series of operations to the at least one other computer, each operation having accompanying instructions that tell the respective computer that received the operation to calculate the operation and then forward the result of that calculation to another computer; and receiving the outcome of the computer program at the trusted computer. Encryption and obfuscation may be used for added security with the method.

A trusted computer is a computer known to be uncompromised by an attacker, and the at least one other computer may be needed to provide computational or other resources. In non-limiting example, the at least one other computer may be trusted or untrusted, part of an enterprise network, part of a cloud, a mobile device, generally part of a plurality of computers, or any other computer or set of computers communicatively connected to the trusted computer, but not including the trusted computer. In further non-limiting example, the at least one other computer may be randomly selected from a plurality of computers. With reference to a "cloud," the cloud may be trusted or untrusted, span multiple administrative domains, span multiple commercially distinct infrastructures, or be in any combination or other context known in the art. Computers may be networked together with a wired connection (electrically or optically), wireless connection, and/or any type of connection allowing the computers to communicate data. A computer may also comprise a virtual machine or group of virtual machines.

Dividing the computer program into a series of operations and sending each operation of the series of operations to the at least one computer with accompanying instructions may be referred to as "shredding," with each operation called a "shred." The shredding process transforms the program into a collection of shreds, where each shred executes a part of the program on the at least one computer and communicates with other shreds such that the ensemble of shreds execute the complete program. In an embodiment, the shredding process places the shreds on networked computers using a random selection of computers such that each computer performs the partial computation specified in its shred and then forwards the rest of the computation to the next computer. Each computer only knows where it received a shred from, what it is supposed to compute within a shred, and where to forward the results of its shred to. If the number of networked computers is large enough, a possible attacker will not be able to monitor all computers simultaneously to piece together the shredded computation.

FIG. 1 shows an example program being executed on trusted computers and cloud computers using an embodiment of the shredding process. The program 100 contains four parts: an input, a function a function 'g', and an output. The shredder program that executes on a trusted computer analyzes the binary executable for this program to discover the four parts, and accordingly produces four shreds, which are also in binary executable form. The input and output operations are executed on Trusted Computer 1 (TC1) 110 and Trusted Computer 4 (TC4) 140, respectively. TC1 110 and TC4 140 are chosen by the shredder because they are connected to the required input and output devices. The functions 'f' and 'g' are computationally expensive and are therefore executed on Cloud Computer 2 (CC2) 120 and Cloud Computer 3 (CC3) 130, respectively. CC2 120 and CC3 130 were randomly chosen by the shredder from the pool of available machines. TC1 110 receives input and assigns the input to variable 'x', which it then forwards to CC2 120. CC2 120 receives variable 'x' and computes function "f(x)", assigning the result to variable 'y', which it then forwards to CC3 130. CC3 130 receives variable 'y' and computes function "g(x)", assigning the result to variable 'z', which it then forwards to TC4 140. TC4 140 receives variable 'z' and outputs it.

As can be seen in FIG. 1, some of the series of operations may require an input and/or output (I/O) interaction from a trusted computer. To account for lack of an I/O device, or trusted I/O (for security, only trusted computers should see plain data from I/O devices), on a computer executing a shred, special "split" device drivers may be implemented. A split device driver is actually two drivers, one on each computer, wherein each driver performs half the work of a normal device driver. Because both halves of the driver execute as user processes, they require no modification of the operating systems on both the computer executing a shred and the trusted computer. The following are example embodiments illustrating how a split device driver may be implemented and used.

In an embodiment, if, during computation of a result of an operation, or shred, on a certain computer, the operation requires input from a device connected to a first trusted computer, the certain computer may: generate an input request at a program driver on the certain computer; pass the input request from the program driver to a network driver; send the input request to the first trusted computer via the network driver; receive a response of the device at the network driver from the first trusted computer; and pass the response from the network driver to the program driver for use in the computation. The received response may be encrypted for added security.

In an embodiment, if, during computation of a result of an operation, or shred, on a certain computer, the operation requires input from a device connected to a first trusted computer, the first trusted computer may: receive from the certain computer, at a network driver on the first trusted computer, a request for input from the device; pass the request from the network driver to an input driver for the device; pass a response from the device from the input driver to the network driver; and send the response to the certain computer via the network driver. The first trusted computer may encrypt the response from the device before passing the response from the input driver to the network driver for added security.

In an embodiment, if, during computation of a result of an operation on a certain computer, the operation requires output from a device connected to a first trusted computer, the certain computer may: generate an output request at a program driver on the certain computer; pass the output request from the program driver to a network driver; send the output request to the first trusted computer via the network driver; receive a status of the device at the network driver from the first trusted computer; and pass the status from the network driver to the program driver for use in the computation. The output request may include encrypted data.

In an embodiment, if, during computation of a result of an operation on a certain computer, the operation requires output from a device connected to a first trusted computer, the first trusted computer may: receive from the certain computer, at a network driver on the first trusted computer, a request for output to the device; pass the request from the network driver to an output driver for the device; pass a status from the device from the output driver to the network driver; and send the status to the certain computer via the network driver. The request may include encrypted data, and the first trusted computer may need to decrypt that data before passing the request from the network driver to the output driver.

In an embodiment, if, during computation of a result of an operation on a certain computer, the operation requires input from a device connected to a first trusted computer, the method to gather that input may include: generating an input request at a program driver on the certain computer; passing the input request from the program driver to a first network driver; sending the input request to the first trusted computer via the first network driver; receiving from the certain computer, at a second network driver on the first trusted computer, the input request; passing the input request from the second network driver to an input driver for the device; passing a response from the device from the input driver to the second network driver; sending the response to the certain computer via the second network driver; receiving the response of the device at the first network driver from the first trusted computer; and passing the response from the first network driver to the program driver for use in the computation. For added security, the method may further include encrypting the response from the device before passing the response from the input driver to the second network driver. Therefore, the received response from the first trusted computer may be encrypted.

In an embodiment, if, during computation of a result of an operation on a certain computer, the operation requires output from a device connected to a first trusted computer, the method to perform that output may include: generating an output request at a program driver on the certain computer; passing the output request from the program driver to a first network driver; sending the output request to the first trusted computer via the first network driver; receiving from the certain computer, at a second network driver on the first trusted computer, the output request; passing the output request from the second network driver to an output driver for the device; passing a status from the device from the output driver to the second network driver; sending the status to the certain computer via the second network driver; receiving the status at the first network driver from the first trusted computer; and passing the status from the first network driver to the program driver for use in the computation. For added security, the output request may include encrypted data, which would then need to be decrypted before passing the output request from the second network driver to the output driver.

Encryption may be used on several levels for added security. All network connections between the trusted computer and the at least one other computer may be encrypted. Such network encryption may be implemented by using, for example, Transport Layer Security (TLS) or any other suitable encryption scheme.

Figure 2:
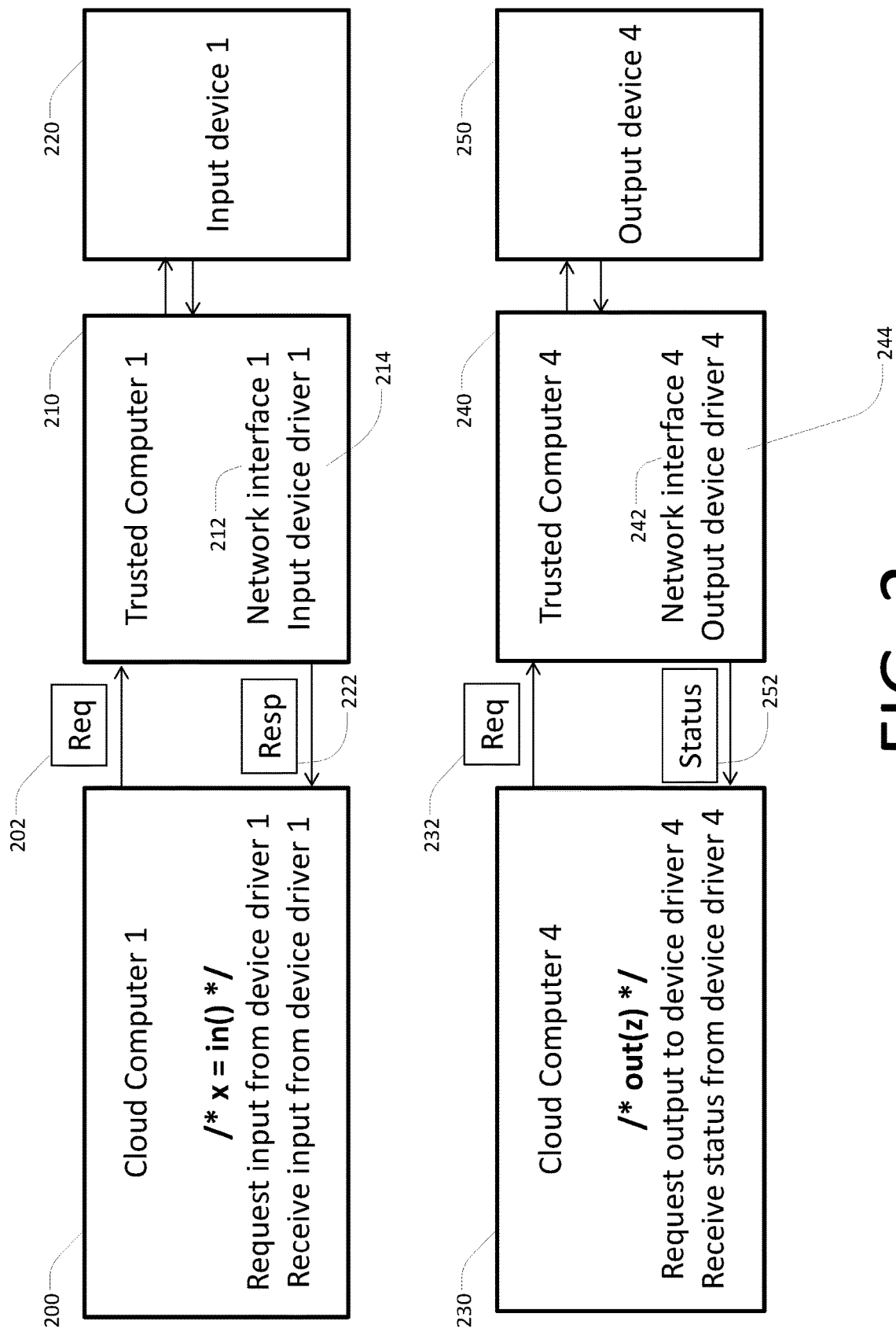
FIG. 2 illustrates an embodiment of the present invention directed to split device driver operation.

FIG. 2 shows a high-level embodiment of split device drivers' implementation and operation, which, though not explicitly shown, may involve TLS encryption for network communications. The split device driver on Cloud Computer 1 (CC1) 200 contains two parts: the driver that interfaces with the program, and the driver that interfaces with the network. Similarly, the split device driver on Trusted Computer 1 (TC1) 210 contains two parts: the driver that interfaces with the network, Network Interface 1 212, and the driver that interfaces with the input device, Input Device Driver 1 214. CC1 200 executes the "x=in( )" input operation by making use of the split device driver scheme. For the input operation, the driver that interfaces with the program generates an input request 202. This input request 202 is passed to the driver that interfaces with the network for TLS encryption and transmission to TC1 210. Network Interface 1 212 receives the request and passes it to Input Device Driver 1 214. When a response is received from the input device, Input Device 1 220, the response is passed by Input Device Driver 1 214 to Network Interface 1 212. Network Interface 1 212 encrypts the response using TLS and transmits the response 222 to CC1 200. The network driver on CC1 200 forwards the TLS decrypted response 222 to the program interface driver, which in turn forwards it to the waiting program. The program assigns the received input to the variable 'x' and continues execution. Also shown in FIG. 2 is how output may be performed using split device drivers between Cloud Computer 4 (CC4) 230 and Trusted Computer 4 (TC4) 240. The operation of the split device drivers for output is similar to the input operation except that instead of receiving input from the device, the computers receive a status message 252.

Each operation of the series of operations, or each shred, may be encrypted. Each shred may be encrypted using a symmetric-key encryption scheme such as Advanced Encryption Standard (AES) Galois Counter Mode (GCM) or any other suitable scheme. A symmetric-key encryption uses the shared key(s) of the at least one other computer such that each shred is encrypted using a different key. Such a scheme permits decryption of a shred only on the other computer for which the shred is intended, but hides the rest of the program from any other computers.

Each data value of each operation of the series of operations may be encrypted. Encrypting the data values may be performed using a symmetric-key scheme, such as AES GCM, a public-key scheme, such as RSA, or any other suitable scheme. Such an encryption is performed on both the trusted computer and the at least one other computer. If a symmetric-key scheme is used, the secret key used is the shared key of the link between the sender and receiver of the data. If a public-key scheme is used, the sender uses the public key of the receiver for encryption, and the receiver uses its private key for decryption. Such schemes enable the at least one other computer to decrypt the data that it needs for computation, but hides all other data from it.

Figure 3:
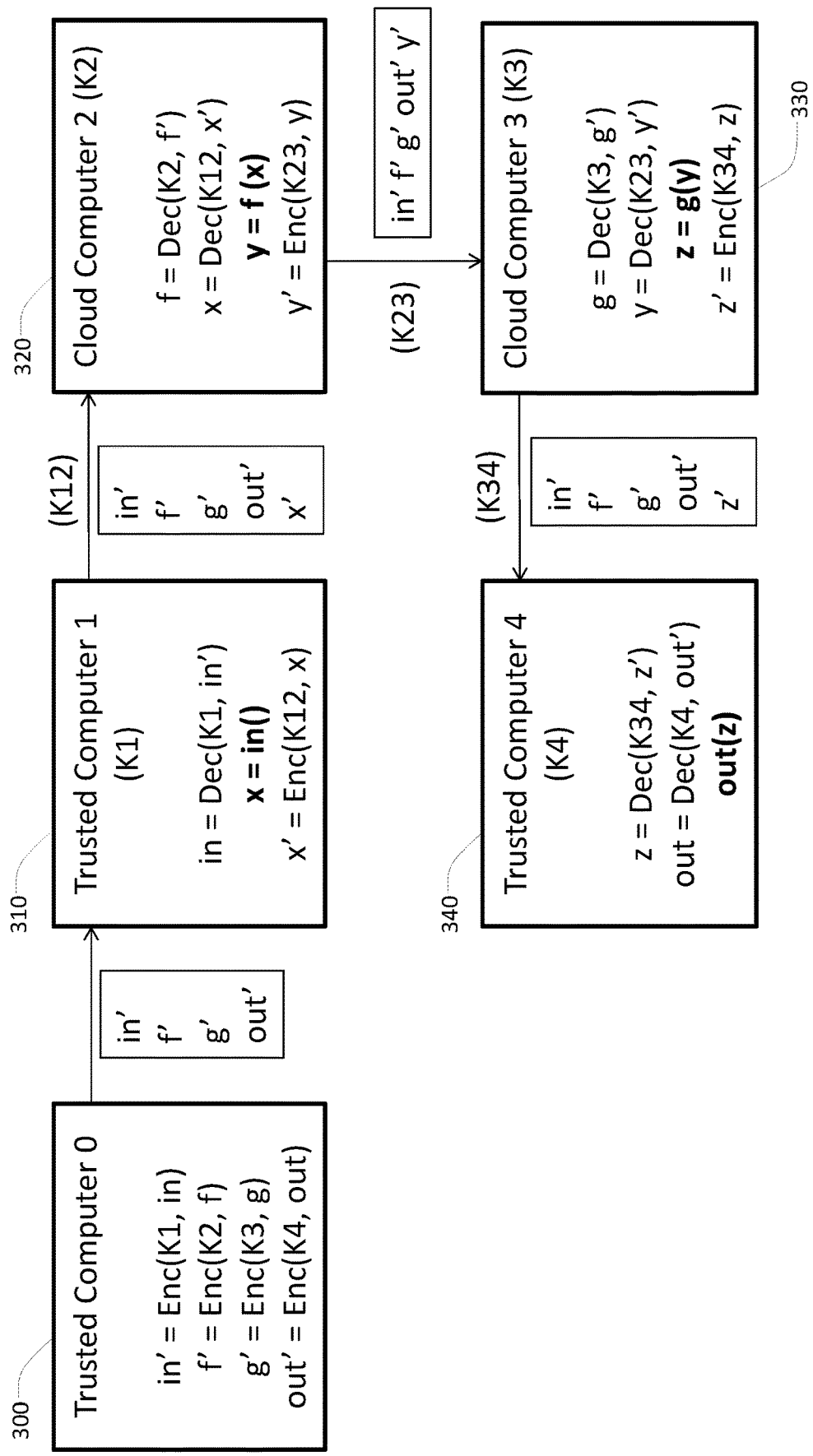
FIG. 3 illustrates an embodiment of the present invention directed to symmetric-key encryption and decryption operations for shreds of code and data.

FIG. 3 shows an embodiment of symmetric-key encryption and decryption operations for the shreds of the code and data in the example program of FIG. 1. FIG. 3, like FIG. 2, does not explicitly show the TLS encryption and decryption of the communication packets. The four computers involved in the computation of the program, Trusted Computer 1 (TC1) 310, Cloud Computer 2 (CC2) 320, Cloud Computer 3 (CC3) 330, and Trusted Computer 4 (TC4) 340, have secret keys K1, K2, K3, and K4, respectively, that are known to Trusted Computer 0 (TC0) 300. The shredded program code is encrypted on TC0 300 during the shredding operation using shared keys K1, K2, K3, and K4. For example, the statement "in'=Enc(K1, in)" on TC0 300 denotes the encryption of the code for "in" using key K1 to produce the encrypted code "in'". The corresponding decryption operation on TC1 310 is "in=Enc(K1, in')" and this decryption produces the code for the "in" operation. TC1 310 is not able to decrypt any other part of the encrypted program because TC1 310 only knows key K1, and attempting to decrypt some other portion of the code using key K1 would not produce valid code. This encrypting and decrypting process is repeated for all shreds using the keys of each computer sent a shred for computation, allowing each computer access to only the shred it is meant to compute. The communication links between the computers also have shared keys that are known only to the sender and receiver of data. In this case, the shared keys for the communication links are K12, K23, and K34. For example, shared key K12 is used by TC1 310 to encrypt input 'x' to ciphertext 'x", and x' is decrypted using key K12 on CC2 320 to yield 'x'. This process is used from computer to computer to ensure an attacker cannot intercept plaintext over the network.

Obfuscation should be used for additional security and may comprise data obfuscation, code obfuscation, or both. Obfuscation may involve modifying the code and/or data within each shred to hide the original code and data from an attacker at an other computer. Code obfuscation uses obfuscating transformations to hide the logic of the original program from an attacker that has complete visibility of a shred's code as well as the instructions and data during shred execution. Data obfuscation transforms the data so that shredded code executes on obfuscated data values such that it is difficult for an attacker to recover the unobfuscated data value; blinding is a type of data obfuscation.

Obfuscation with shredding involves obfuscating each operation of the series of operations before sending each operation to a respective other computer and unobfuscating the received computed outcome of the computer program. The method of obfuscation differs depending on the level of shredding, and shredding may be performed on at least four different levels: gate level, hardware-unit level, instruction level, encryption-scheme level, and any other scheme allowing the program to be broken into units.

Figure 4:
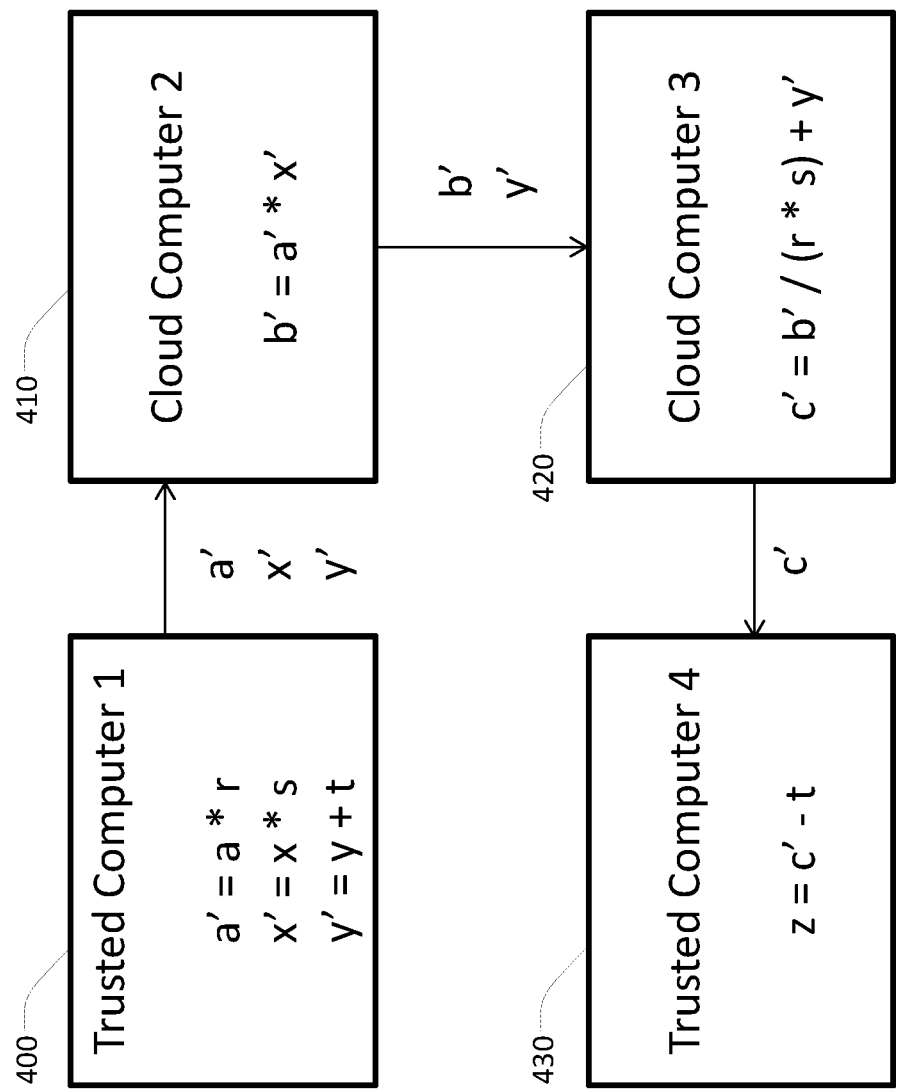
FIG. 4 illustrates an embodiment of the present invention directed to obfuscating shreds.

FIG. 4 shows an example of obfuscating the program "z=a*x+y" across four computers. The aim of obfuscation is to hide the values of inputs 'a', 'x', and 'y' and output 'z' from attackers at Cloud Computer 2 (CC2) 410 and Cloud Computer 3 (CC3) 420. Trusted Computer 1 (TC1) 400 introduces three random values, 'r', 's', and T, that are used as one-time pads for obfuscating the values of inputs 'a', 'x', and 'y', respectively. The operation used for obfuscation depends on the use of the variable. For example, variables 'a' and 'x' are multiplied, so the obfuscation operation multiplies 'a' and 'x' by their pad values 'r' and 's', whereas variable 'y' is an addend, so the obfuscation operation adds one-time pad T. CC2 410 and CC3 420 perform computation using obfuscated values 'a"', 'x"', and 'y"' to compute 'b" and 'c", respectively. CC3 420 performs the unobfuscation of 'b" by dividing by 'r' and 's', and Trusted Computer 4 (TC4) 430 performs the unobfuscation of the value 'c" by subtracting the pad 't'. These procedures ensure that an attacker can never see the actual value of the variables involved.

Gate-level shredding is the finest level of shredding and offers perfect secrecy because it is impossible for an attacker who observes a single other computer to understand the calculation or recover the original inputs or outputs of the calculation. However, it is the slowest level of shredding and does not offer the ability to perform I/O operations on other computers. At this level, the program is divided into a circuit consisting of AND, OR, NAND, NOR, and NOT gates, and the NOT gates may be converted to NAND gates with equal input to ensure each gate operation has two operands. In this manner, the series of operations the program has been divided into are circuit gate operations, with each circuit gate operation having an operator, a first operand, and a second operand.

In an embodiment, each gate in the circuit of gate operations is obfuscated and shredded across two other computers. For each gate operation, the process involves the trusted computer obfuscating the first operand with a first random value and obfuscating the second operand with a second random value. Then, the obfuscated operands are sent to a first computer with instructions for the first computer to compute a plurality of results of a plurality of operations using the obfuscated operands and send the plurality of results to a second computer. The trusted computer sends the second computer instructions: to choose a result of the plurality of results based upon the operator, the first random value, and the second random value; to obfuscate the chosen result with a third random value; and to send the chosen result to a different computer, which may be a trusted computer or another computer.

Figure 5:
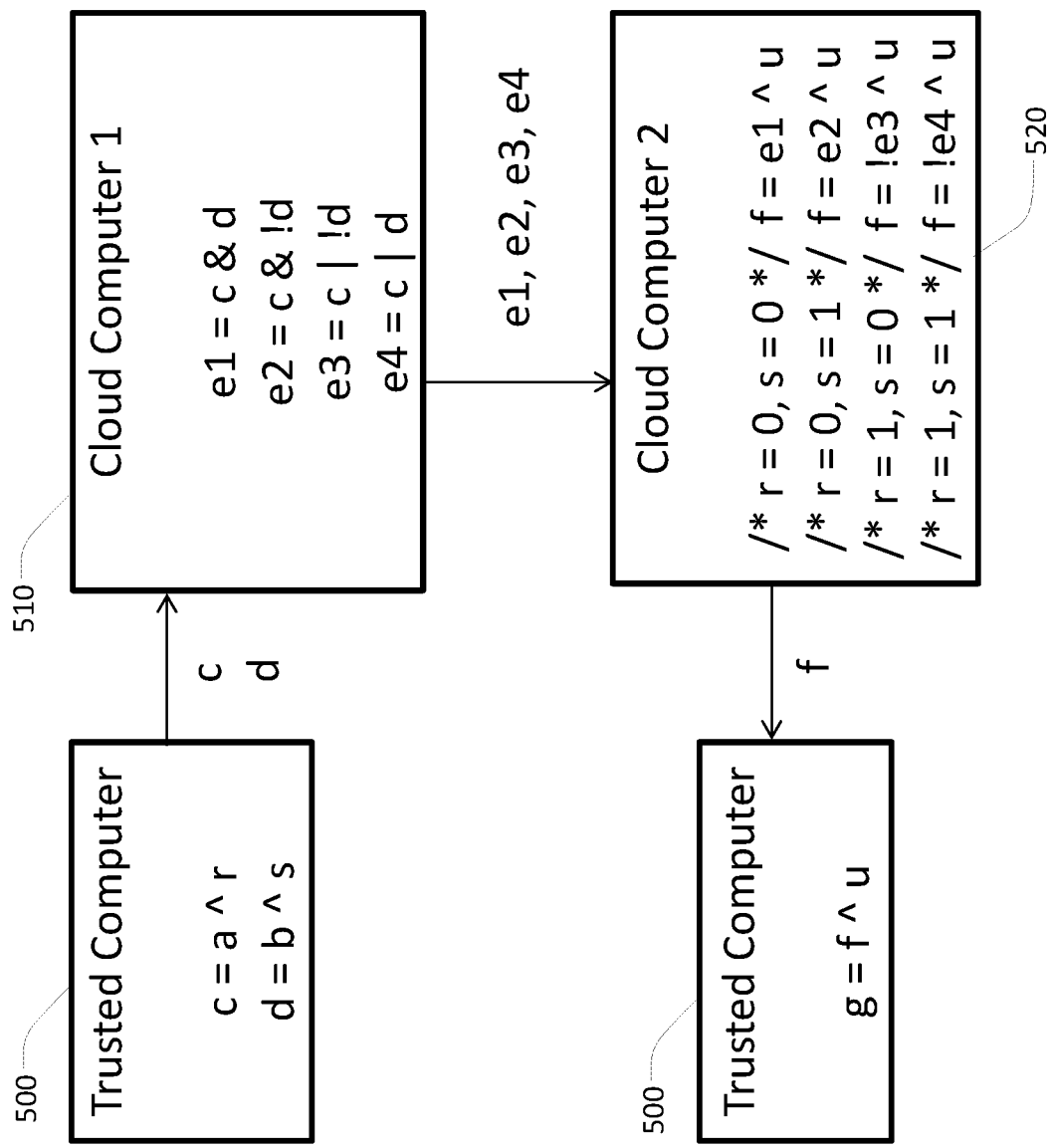
FIG. 5 illustrates an embodiment of the present invention directed to shredding a circuit gate operation.

FIG. 5 shows an example embodiment of shredding a gate computation across two other computers, namely Cloud Computer 1 (CC1) 510 and Cloud Computer 2 (CC2) 520. In this example, the gate operation "g=a & b" is the current shred to be executed. Like FIG. 4, this embodiment uses one-time pads, but with random values 'r', 's', and 'u'. Trusted Computer (TC) 500 generates an obfuscated program to perform "g=a & b" as follows. First, TC 500 selects two random bits, 'r' and 's', to obfuscate 'a' and 'b', respectively. It then calculates "c=a^r" and "d=b^s" wherein the '^' operator denotes an XOR operation. TC 500 then sends 'c' and 'd' to CC1 510. CC1 510 computes four temporary values: e1=c & d; e2=c & !d; e3=c1 !d; and e4=c|d. CC1 510 then sends {e1, e2, e3, e4} to CC2 520. CC2 520 executes one of the following programs based upon the values of 'r' and 's' and uses a random bit 'u' to obfuscate the result: if {r=0, s=0}, then f=e1 ^u; if {r=0, s=1}, then f=e2 ^u; if {r=1, s=0}, then f=!e3 ^u; and if {r=0, s=0}, then f=!e4 ^u. CC2 520 then sends f to TC 500. TC 500 unobfuscates the result by computing "g=f^u".

Figure 6:
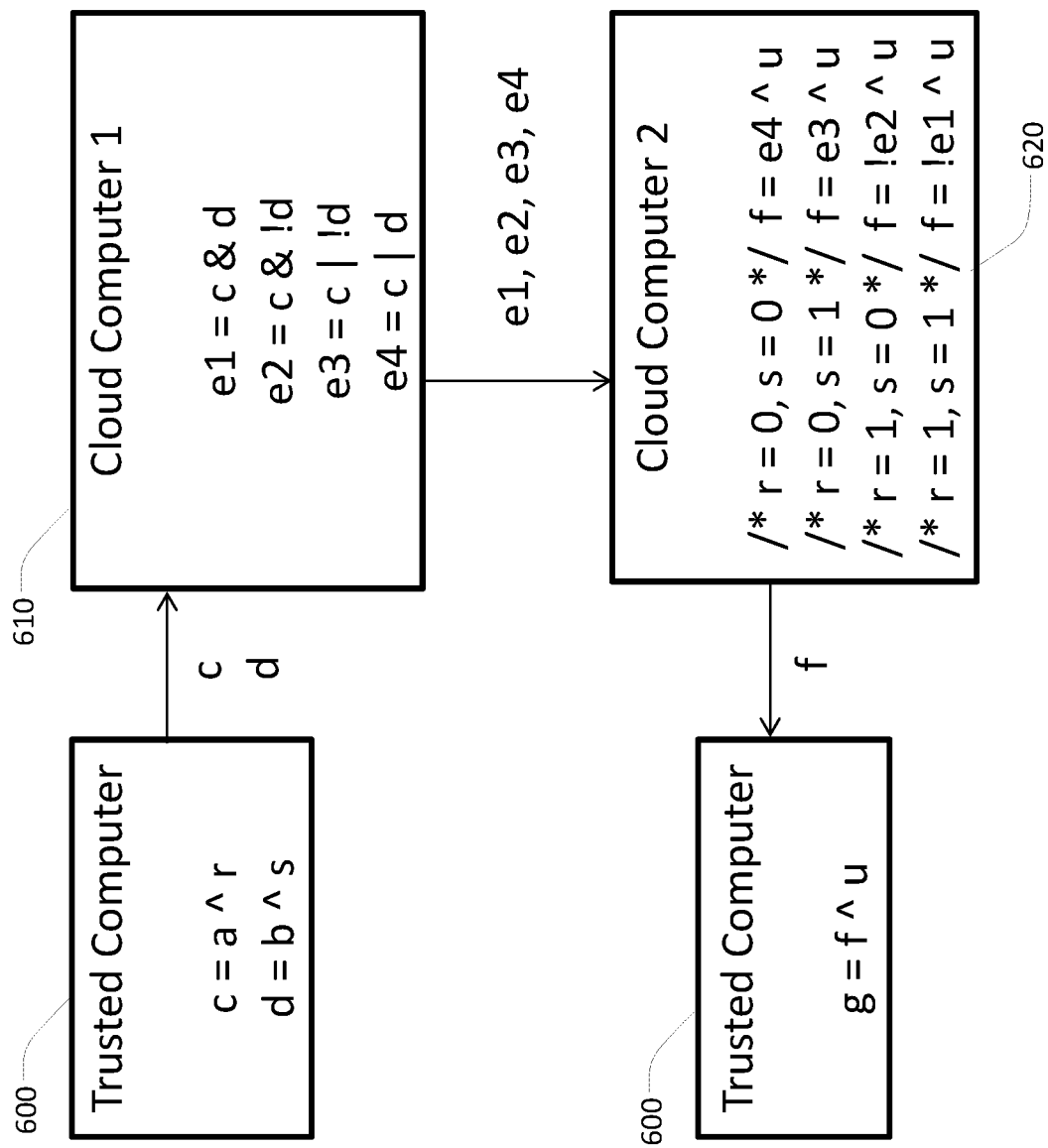
FIG. 6 illustrates an embodiment of the present invention directed to shredding another circuit gate operation.

In the example embodiment of FIG. 5, TC 500 computes three XOR operations for obfuscating the data while CC1 510 and CC2 520 perform the computations. Neither CC1 510 nor CC2 520 knows the input data, output data, or computation because CC1 510 performs four generic operations and CC2 520 selects the correct operation. Although it appears that the computation of AND or the result of the computation is revealed at CC2 520, careful examination shows that both the computation and the data are hidden. The program at CC2 520 is simply a pass through, or a negation, of one of the {e1, e2, e3, e4} values and is generated by the shredder program depending on the random values of 's', and that only it knows. Further, CC2 520 cannot know whether it is computing an AND or OR operation because, as FIG. 6 shows, the following permutation of the variable names at CC1 510 causes CC2 520 to compute "a OR b": e4=c & d; e3=c & !d; e2=c∣!d; e1=c∣d. FIG. 6, calculating "g=a∣b", is identical to FIG. 5 in all respects other than the computation performed at CC2 620.

Similarly, a NAND or NOR operation may be computed by adding an additional NOT operation at CC2 520. As mentioned above, a NOT operation of a single bit can use a NAND operation with equal inputs. A similar method using a random bit 'r' to hide input and another random bit to hide output may be used to obfuscate a sequential circuit that stores a single bit. Thus, any circuit can be obfuscated by introducing a one-time pad (consisting of all the random values of the bits used to hide inputs and outputs) on the TC 500 and generating two shreds to execute the circuit under that one-time pad. This scheme is secure as long as the two shreds are not simultaneously visible to an attacker.

Figure 7:
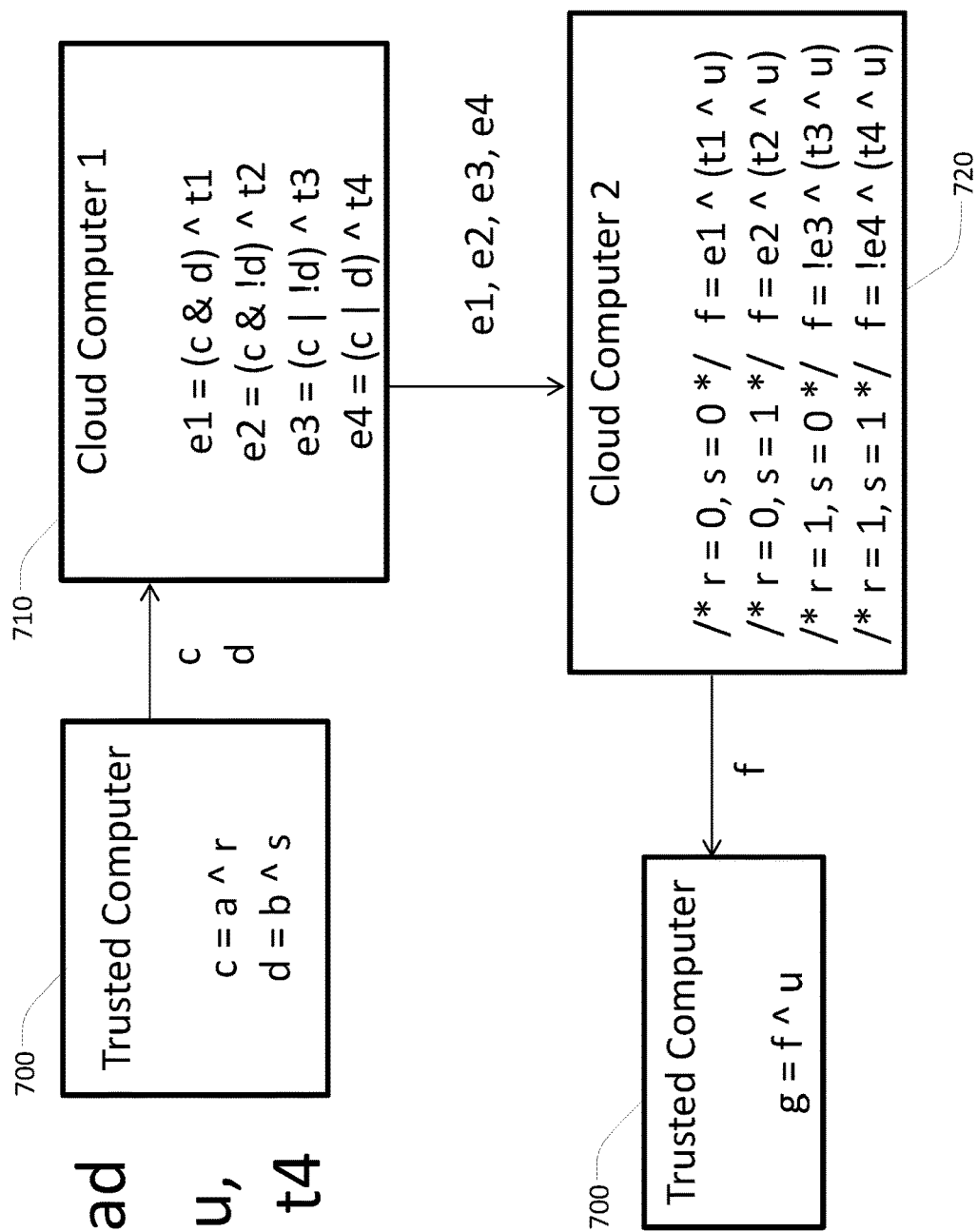
FIG. 7 illustrates an embodiment of the present invention directed to shredding a circuit gate operation with an additional layer of obfuscation.

The one-time pad method illustrated in FIGS. 5-6 is not secure if the circuit is used multiple times because (1) values {e1, e2, e3, e4} that are visible at CC2 (520, 620) have a specific pattern for the four combinations of input variables 'c' and 'd' at CC1 (510, 610) and (2) the pattern of values {e1, e2, e3, e4} for an AND operation is different from the pattern of values {e1, e2, e3, e4} for an OR operation. An attacker at CC2 (520, 620) who collects and analyzes the four values {e1, e2, e3, e4} can determine the operation. To combat this, an additional four random bits 't1', 't2', 't3', and 't4' may be introduced to obfuscate the values of {e1, e2, e3, e4}. FIG. 7 illustrates the computation using these new bits.

FIG. 7 is identical to FIG. 5, but uses {t1, t2, t3, t4} for added obfuscation. In this example, Trusted Computer (TC) 700 obfuscates 'c' and 'd' and sends them to Cloud Computer 1 (CC1) 710, which computes {e1, e2, e3, e4} identically to FIGS. 5-6. However, e1 is now XORed with t1, e2 XORed with t2, e3 XORed with t3, and e4 XORed with t4 to obfuscate the values of {e1, e2, e3, e4}. Generally, Cloud Computer 2 (CC2) 720, or the computer processing the second shred, is either a pass-through or negation of a specific 'e' value, dependent on the operation being computed as well as the values of random bits 'r', 's', 'u', 't1', 't2', 't3', and 't4', as shown in the following table.

Figure 8:
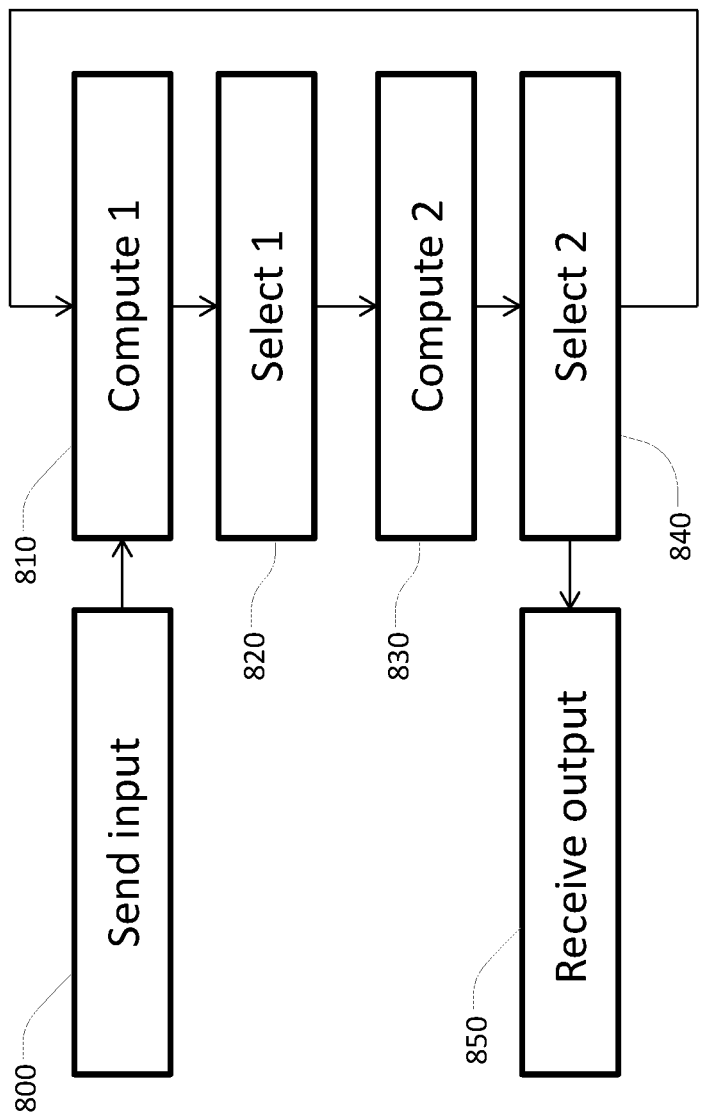
FIG. 8 illustrates an embodiment of the present invention directed to shredding an arbitrary circuit of gate operations on a network of computers.

This scheme for obfuscating an AND, NAND, OR, or NOR operation of two input bits uses a random key containing seven bits (r, s, t1, t2, t3, t4, u) to generate two shreds. The first shred always performs the same boolean operations, the second shred selects the correct operation, and the communication of the intermediate values between the two shreds is obfuscated. This process for obfuscating and computing any arbitrary circuit can be seen in FIG. 8. Each rectangle in FIG. 8 represents a computer. The initial input is sent from a computer 800, labeled "Send Input", to a first computer 810, labeled "Compute 1", where a first shred calculates the operations and sends the operations to a second computer 820, labeled "Select 1", where a second shred selects the correct operation. The process continues (for example, at computers 830 and 840, labeled "Compute 2" and "Select 2" respectively, and then back to Compute 1 810 or another selected computer) until the result of the circuit is computed and sent to the computer 850 labeled "Receive Output".

Hardware-unit-level shredding offers less privacy than gate-level shredding, but executes at a faster speed. This level of shredding divides the program into a circuit comprising operations of hardware units that perform specific functions. Examples include integer addition, integer multiplication, integer comparison, and floating point multiplication, which are standard hardware units in a generic computer. In this manner, the series of operations are mathematical operations, with each mathematical operation having an operator, a first operand, and a second operand. An attacker at an other computer can see the type of operation being performed, but cannot guess the precise operation. For example, an attacker may see that an integer addition is being performed, but cannot see the plain values of the operands or the result. Finally, like gate-level shredding, hardware-unit-level shredding does not offer the ability to perform I/O operations on other computers.

Instruction-level shredding divides the program into instructions such that each shred executes a subset of the instructions. Examples of instructions include x86 machine instructions and Java Virtual Machine (JVM) bytecodes. Like hardware-unit-level shredding, these instructions involve mathematical operations. However, unlike hardware-unit-level shredding, instruction-level shredding accommodates programs that perform I/O operations by using the aforementioned split device drivers.

TABLE 1

Obfuscated Circuit-Gate Operation Selection

| {r, s} | AND | NAND | OR | NOR |
|---|---|---|---|---|
| {r = 0, s = 0} | $f = e_1 \wedge (t_1 \wedge u)$ | $f = !e_1 \wedge (t_1 \wedge u)$ | $f = e_4 \wedge (t_4 \wedge u)$ | $f = !e_4 \wedge (t_4 \wedge u)$ |
| {r = 0, s = 1} | $f = e_2 \wedge (t_2 \wedge u)$ | $f = !e_2 \wedge (t_2 \wedge u)$ | $f = e_3 \wedge (t_3 \wedge u)$ | $f = !e_3 \wedge (t_3 \wedge u)$ |
| {r = 1, s = 0} | $f = !e_3 \wedge (t_3 \wedge u)$ | $f = e_3 \wedge (t_3 \wedge u)$ | $f = !e_2 \wedge (t_2 \wedge u)$ | $f = e_2 \wedge (t_2 \wedge u)$ |
| {r = 1, s = 1} | $f = !e_4 \wedge (t_4 \wedge u)$ | $f = e_4 \wedge (t_4 \wedge u)$ | $f = !e_1 \wedge (t_1 \wedge u)$ | $f = e_1 \wedge (t_1 \wedge u)$ |

In FIG. 7, CC2 720 selects one of the calculations under the AND column because the operation is "g=a & b". Then, CC2 720 sends 'f' to TC 700, where TC 700 unobfuscates it for the final result.

Analysis of the four values of {e1, e2, e3, e4} for each of the four operations (AND, NAND, OR, NOR) shows that exactly the same 16 patterns (for the 16 values of {t1, t2, t3, t4}) appear for each of the four operations. Therefore, an attacker at CC2 720 cannot use these patterns to determine the operation. However, there is some leakage of information because an attacker who sees the program at CC2 720 can determine whether the values of 'r' and 's' are equal.

Figure 12:
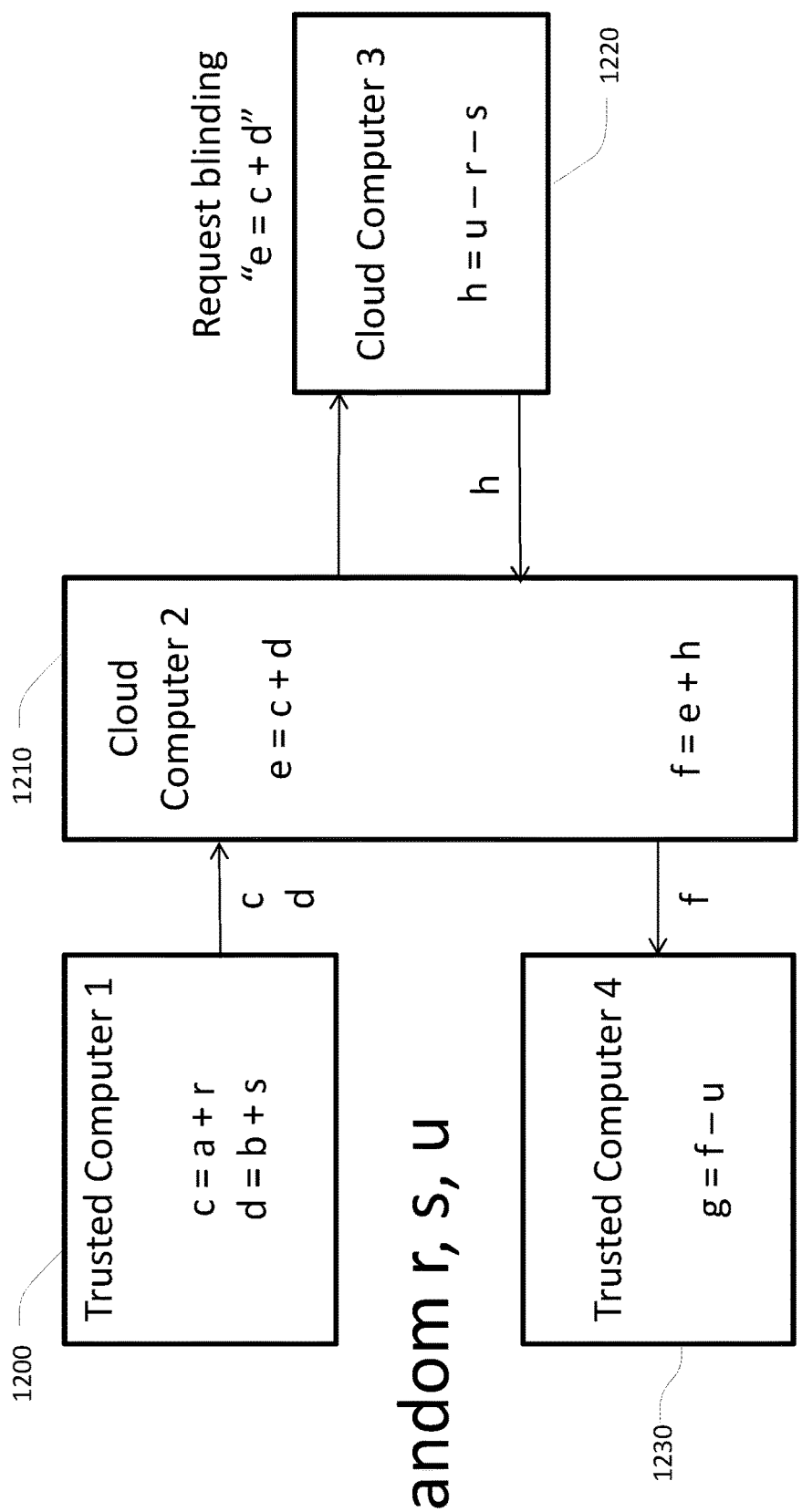
FIG. 12 illustrates an embodiment of the present invention directed to shredding a mathematical operation.
Figure 13:
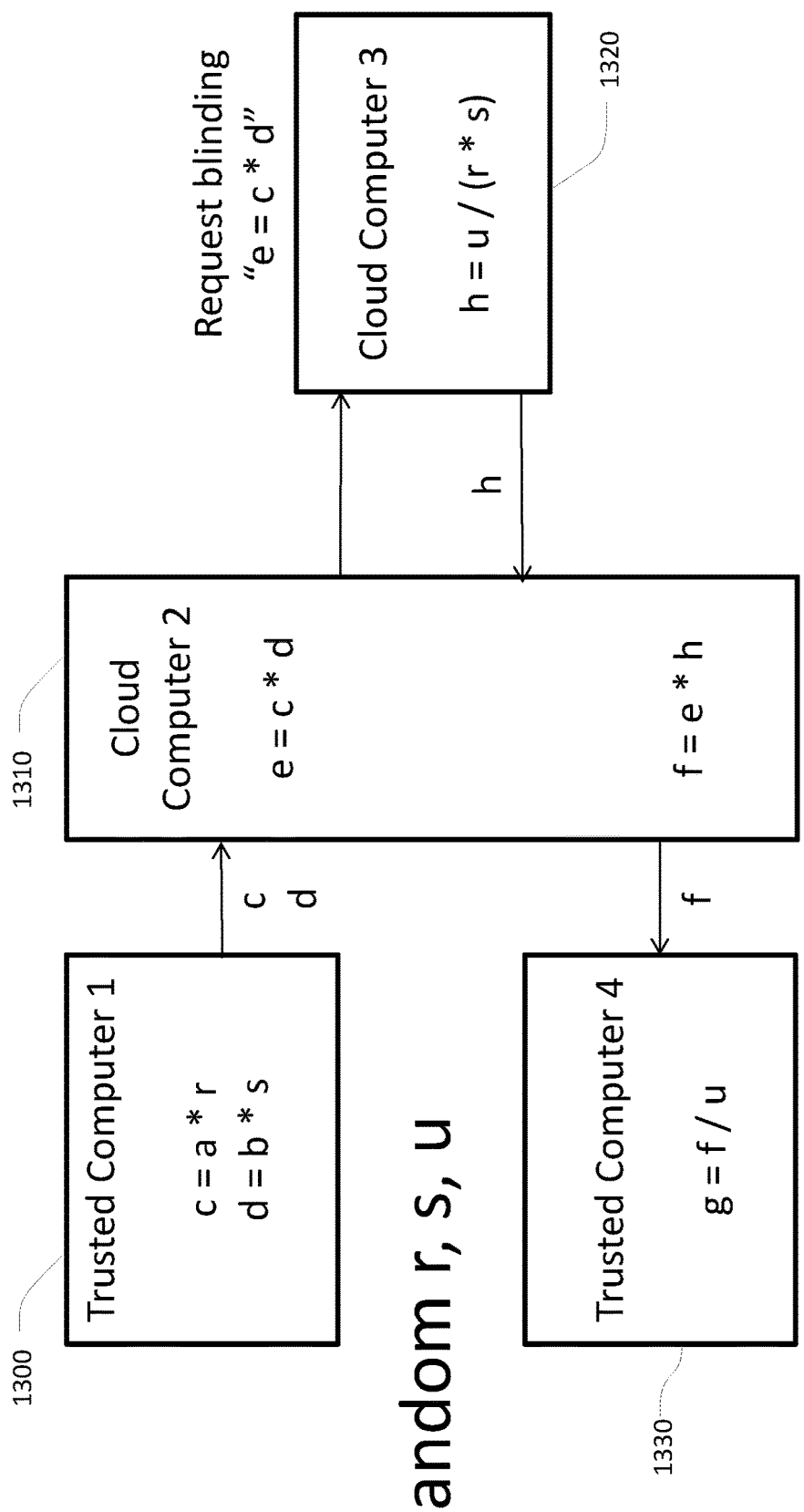
FIG. 13 illustrates an embodiment of the present invention directed to shredding another mathematical operation.
Figure 18:
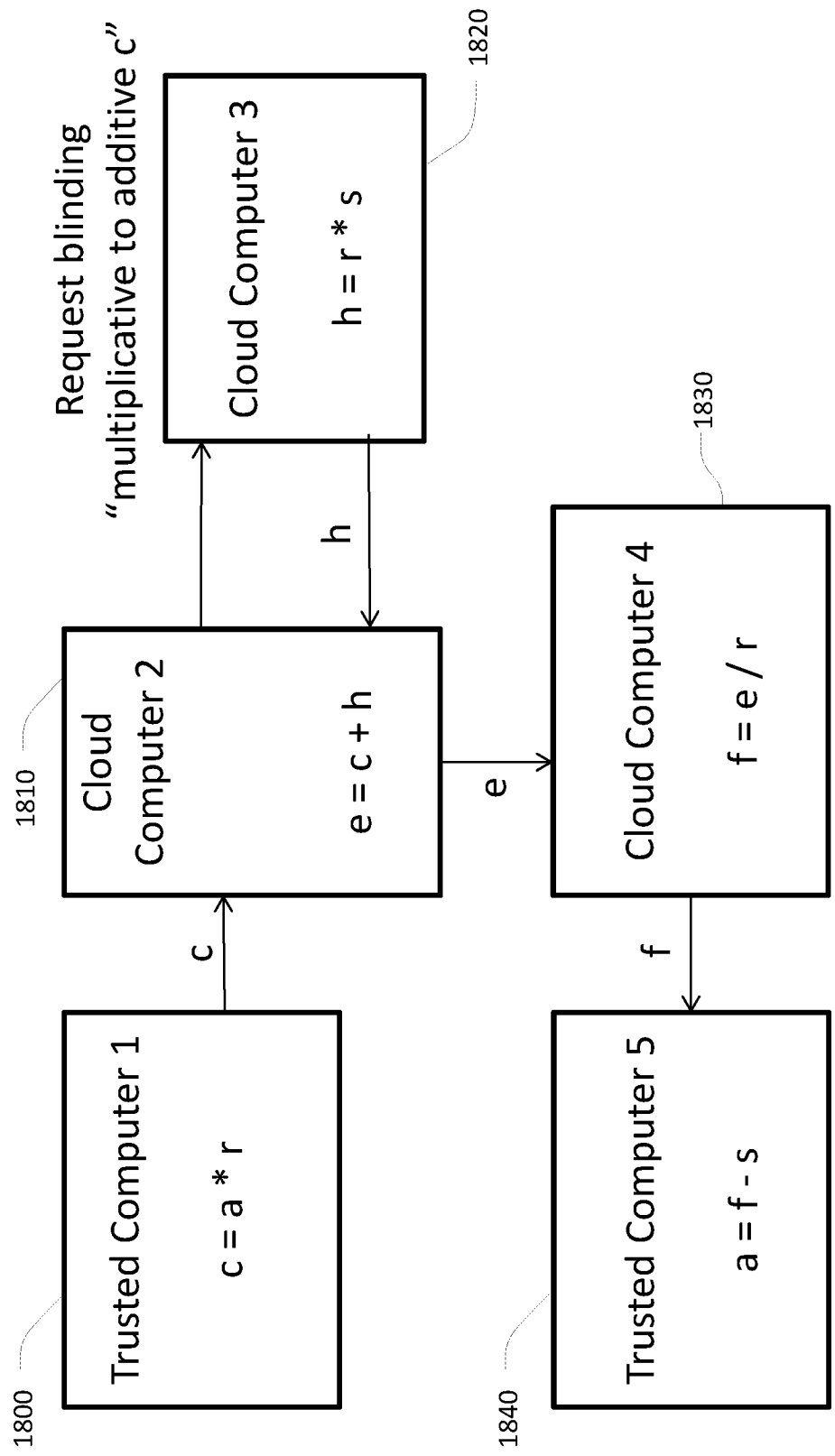
FIG. 18 illustrates an embodiment of the present invention directed to shredding a mathematical obfuscation transition function.

In an embodiment, each mathematical operation of the series of operations the program has been divided into is obfuscated and shredded across two computers. For each mathematical operation, the process involves the trusted computer obfuscating the first operand with a first random value and obfuscating the second operand with a second random value. Then, the obfuscated operands are sent to a first computer with instructions for the first computer to compute a first result of an operation using the operator, the first obfuscated operand, and the second obfuscated operand. The first computer also receives a value from a second computer, computes a second result of an operation using the operator, the first result, and the value, and sends the second result to a different computer, which may be a trusted computer or another computer. The second computer knows the random values used to obfuscate the operands and final result and uses this knowledge to calculate the value sent to the first computer. In some embodiments involving an addition operation, the received value is a third random value minus the sum of the first random value and second random value. FIG. 12, described below, illustrates one such embodiment. In some embodiments involving a multiplication operation, the received value is a third random value divided by the product of the first random value and second random value. FIG. 13, described below, illustrates one such embodiment. Some embodiments might require transitioning an operation from a multiplicative obfuscation scheme to an additive multiplication scheme and vice versa. FIG. 18, described below, illustrates an embodiment transitioning from a multiplicative obfuscation scheme to an additive obfuscation scheme, and FIG. 19, also described below, illustrates an embodiment transitioning from an additive obfuscation scheme to a multiplicative obfuscation scheme.

Random values needed for obfuscation may be generated by the following method. The cycles of execution of the program are numbered so that a variable defined by an instruction executed at cycle T is blinded by function "Key(i)". The function "Key(i)" generates a random floating point value that is not "too big or too small" in order to limit round-off error during floating point calculations. The random floating point value is also non-zero to prevent any division by zero during computation. The "Key" function is implemented using a fast stream cipher, such as Salsa20, that generates a random value for a nonce T. Two secret seeds are used for the stream cipher: one seed for generating the additive blinding values, and a different seed for generating the multiplicative blinding values. Because each instruction in the program is an addition or a multiplication, but not both, the result of the execution is blinded using one of the two seeds. If the result of an instruction that is blinded in one scheme is used in an operation of the opposite scheme, a conversion operation is used to change schemes.

In the examples shown in FIGS. 12-13, the TCs (1200, 1230, 1300, and 1330) and CC3 (1220 and 1320) would know both seeds and CC2 (1210 and 1310) would not know any seed. In the examples shown in FIGS. 18-19, the TCs (1800, 1840, 1900, and 1940) and CC3 1820 and 1920 would know both seeds, CC2 (1810 and 1910) would not know any seed, and CC4 (1830 and 1930) would know only the multiplicative seed.

Shredding performed at the encryption-scheme level encrypts each data value of each operation of the series of operations using homomorphic encryption schemes that depend on the operations that are performed on the data. Addition operations are encrypted using an Additive Homomorphic Encryption (AHE) scheme, such as Paillier, and multiplication operations are encrypted using a Multiplicative Homomorphic Encryption (MHE) scheme, such as El Gamal. When data encrypted in one scheme need to be operated on using an incompatible operation, transition encryption functions may be used to convert AHE data values to MHE data values and convert MHE data values to AHE data values. These transition functions may be shredded for added security by dividing a transition encryption function into a series of operations and sending each operation of the transition encryption function with accompanying instructions to at least one other computer, the accompanying instructions operative to compute a result of the respective operation and forward the result to another computer.

Figure 14:
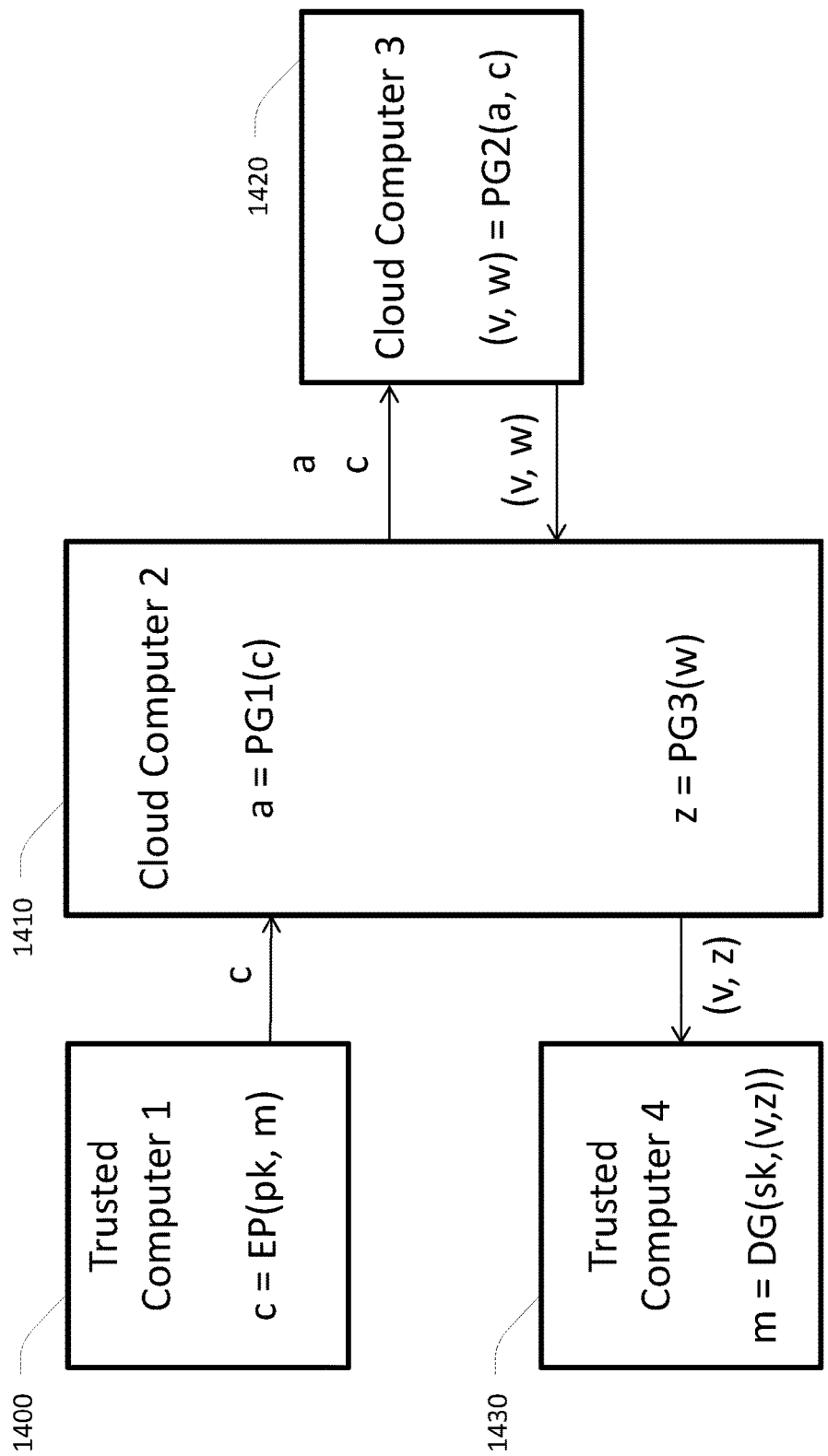
FIG. 14 illustrates an embodiment of the present invention directed to shredding a transition encryption function.

FIG. 14, described below, shows an embodiment of a shredded transition encryption function from Paillier to El Gamal, and FIG. 15, also described below, shows an embodiment of a shredded transition encryption function from El Gamal to Paillier. It is also possible to compare two encrypted integers. FIG. 16, described below, shows an embodiment of a shredded comparison function using Paillier encryption, and FIG. 17, also described below, shows an embodiment of a shredded comparison function using El Gamal encryption.

Figure 9:
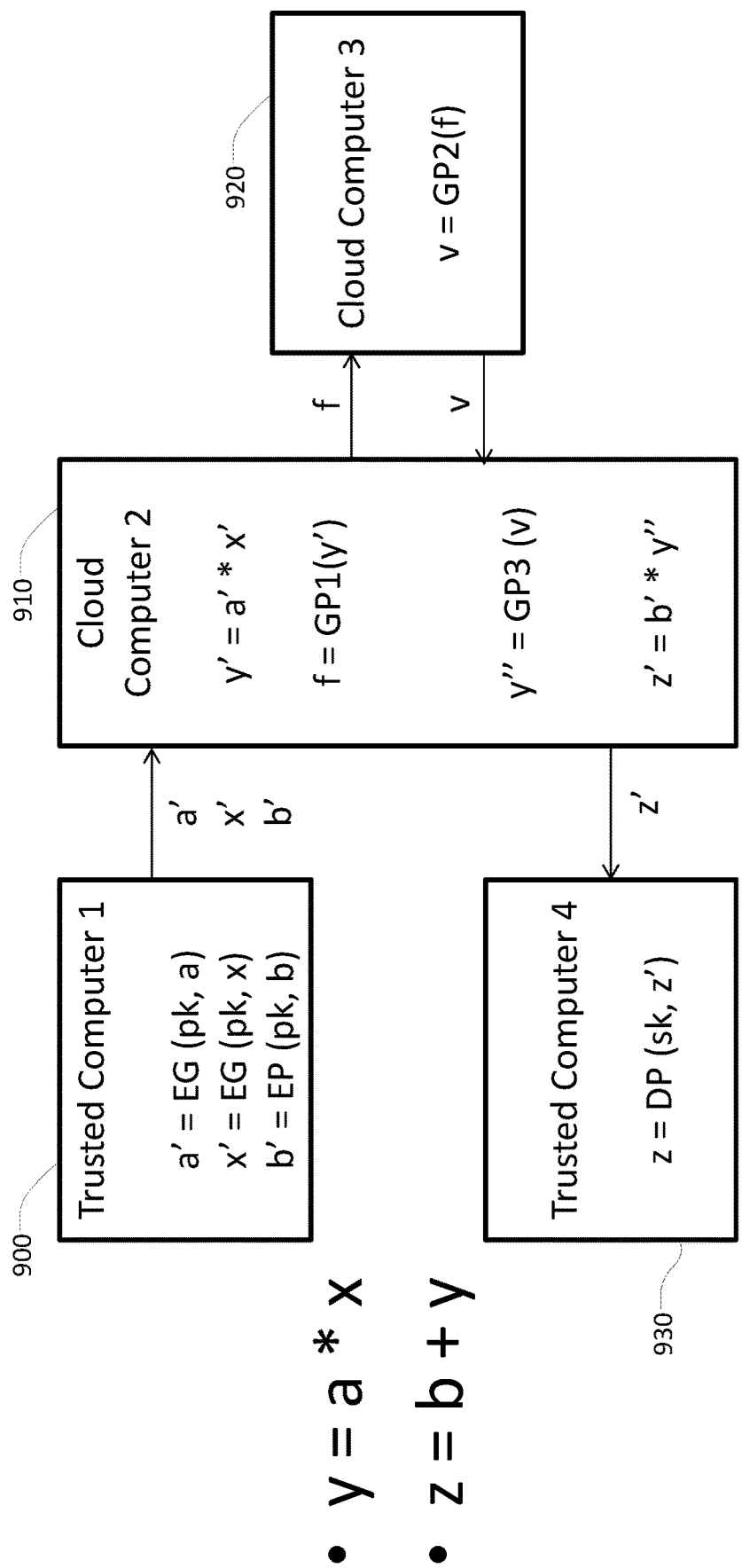
FIG. 9 illustrates an embodiment of the present invention directed to shredding an operation with added encryption.

FIG. 9 shows an example embodiment executing "$z=a*x+b$" using El Gamal and Paillier encryption schemes. Trusted Computer 1 (TC1) 900 encrypts the 'a' and 'x' values using El Gamal and the 'b' value using Paillier. The "EG( )" function refers to encrypting with El Gamal, and the "EP( )" functions refers to encrypting with Paillier. Cloud Computer 2 (CC2) 910 computes the multiplication "$a*x$" on the MHE-encrypted values to produce an MHE-encrypted value of 'y'. CC2 910 then uses the shredded transition functions "GP1( )", "GP2( )", and "GP3 ( )" with Cloud Computer 3 (CC3) 920 to convert the El Gamal-encrypted value of 'y' to a Paillier-encrypted value, 'y'", and adds "$b+y$" by multiplying the AHE-encrypted values. Trusted Computer 4 (TC4) 930 then receives the Paillier-encrypted value of 'z' and decrypts it, using the decrypt Paillier function "DP( )", for the solution. Shredded transition functions "GP1 ( )", "GP2( )", and "GP3 ( )" are described more fully in respect to FIG. 15, below.

Figure 10:
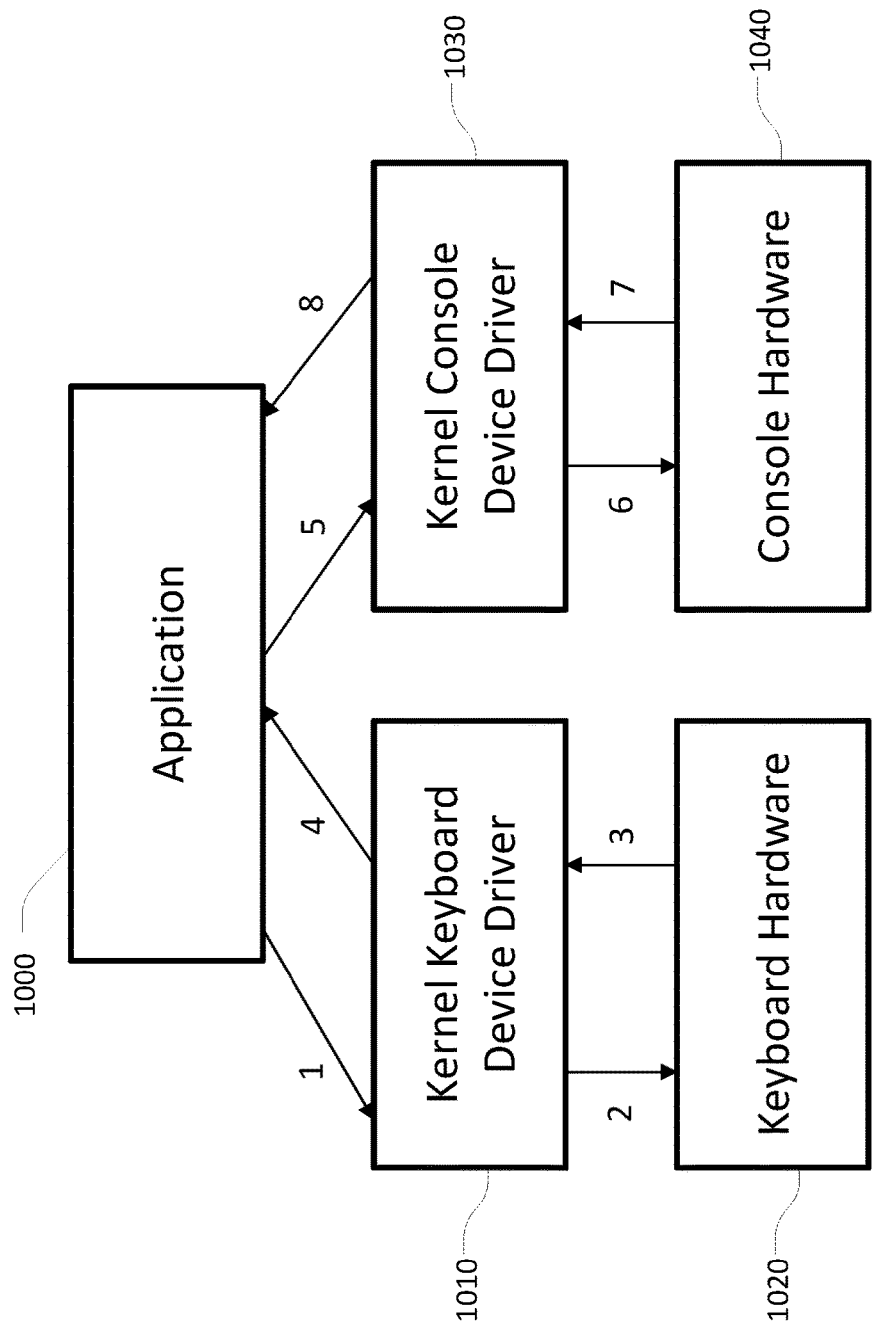
FIG. 10 illustrates normal device driver operation.

As previously mentioned, split device drivers enable input and output operations in shreds executing on other computers. As an additional security layer, it is preferable to allow shreds to only operate on encrypted data from I/O devices so that only trusted computers may see plain data from I/O devices. FIG. 10 shows an example operation of a normal device driver interaction operating on a single computer, while, in contrast, FIG. 11 shows a detailed example operation of a split device driver interaction between a trusted computer and a cloud computer.

FIG. 10 shows an example operation of a normal device driver interaction operating on a single computer. The example application, Application 1000, shown in FIG. 10 requests input from a keyboard, Keyboard Hardware 1020, and outputs that input to a console or screen, Console Hardware 1040. The process requires the eight steps labeled in FIG. 10. At step 1, the application requests a character from Kernel Keyboard Device Driver (KK) 1010 in the computer's kernel. At step 2, KK 1010 requests a character from Keyboard Hardware 1020. At step 3, Keyboard Hardware 1020 has received input and responds to KK 1010 with a character. At step 4, KK 1010 passes the character to the application to complete the input operation. At step 5, the application starts the output operation and sends the character to Kernel Console Device Driver (KC) 1030 in the computer's kernel. At step 6, KC 1030 sends the character to Console Hardware 1040. At step 7, Console Hardware 1040 prints the character and sends a status to KC 1030. At step 8, KC 1030 passes the status to Application 1000. At this stage, the output operation is now complete, and Application 1000 is aware of the status of the output, e.g., if it printed to the console screen, error, etc.

Figure 11:
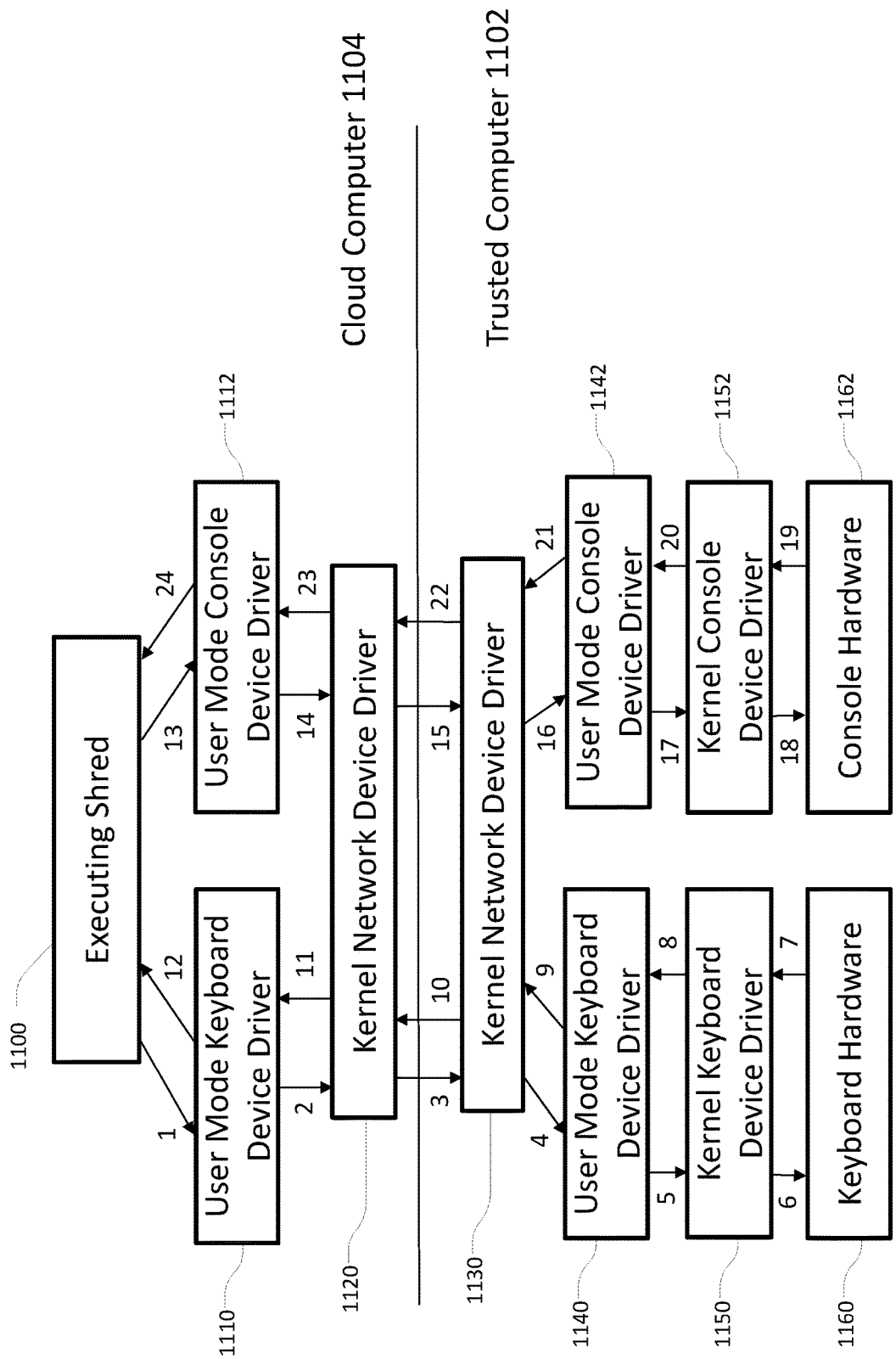
FIG. 11 illustrates an embodiment of the present invention directed to split device driver operation.

FIG. 11 shows operation of an embodiment of a split device driver between Trusted Computer (TC) 1102 and Cloud Computer (CC) 1104 performing the same functions as FIG. 10: Executing Shred 1100 requires input from Keyboard Hardware 1160 (steps 1-12) and then outputs that input to Console Hardware 1162 (steps 13-24). Because CC 1104 must get input from a trusted computer and output to a trusted computer for security purposes (here, that is TC 1102), the device drivers are split between CC 1104 and TC 1102.

The input portion of FIG. 11 is as follows. At step 1, Executing Shred 1100 requests a character from the split keyboard device driver in user mode, User Mode Keyboard Device Driver (CCUMK) 1110. At step 2, CCUMK 1110 uses Kernel Network Device Driver (CCKN) 1120 to request the character. At step 3, CCKN 1120 communicates with Kernel Network Device Driver on TC (TCKN) 1130. At step 4, TCKN 1130 requests a character from User Mode Keyboard Device Driver (TCUMK) 1140. At step 5, TCUMK 1140 requests a character from Kernel Keyboard Device Driver (TCKK) 1150. At step 6, TCKK 1150 requests a character from Keyboard Hardware 1160. At step 7, Keyboard Hardware 1160 has received input and responds to TCKK 1150 with a character. At step 8, TCKK 1150 sends the character to TCUMK 1140. At step 9, TCUMK 1140 encrypts the received character and sends it to TCKN 1130. At step 10, TCKN 1130 sends the encrypted character to CCKN 1120. At step 11, CCKN 1120 sends the encrypted character to CCUMK 1110. At step 12, CCUMK 1110 passes the encrypted character to Executing Shred 1100 to complete the input operation.

The output portion of FIG. 11 is as follows and assumes that Executing Shred 1100 has received the encrypted character from the process of steps 1-12. At step 13, Executing Shred 1100 begins the output operation and sends the encrypted character to the split console device driver in user mode, User Mode Console Device Driver (CCUMC) 1112. At step 14, CCUMC 1112 uses CCKN 1120 to send the encrypted character. At step 15, CCKN 1120 communicates with TCKN 1130. At step 16, TCKN 1130 sends the encrypted character to User Mode Console Device Driver (TCUMC) 1142. At step 17, TCUMC 1142 decrypts the character and sends the plain character to Kernel Console Device Driver (TCKC) 1152. At step 18, TCKC 1152 sends the plain character to Console Hardware 1162. At step 19, Console Hardware 1162 prints the character and sends a status to TCKC 1152. At step 20, TCKC 1152 sends the status to TCUMC 1142. At step 21, TCUMC 1142 sends a status to TCKN 1130. At step 22, TCKN 1130 sends the status to CCKN 1120. At step 23, CCKN 1120 sends the status to CCUMC 1112. At step 24, CCUMC 1112 sends the status to Executing Shred 1100. At this stage, the output operation is now complete, and Executing Shred 1100 is aware of the status of the output, e.g., if it printed to the console screen, error, etc.

Other than the split drivers, an additional difference between Application 1000 in FIG. 10 and Executing Shred 1100 in FIG. 11 is that Executing Shred 1100 operates on encrypted data, and hence can execute on a computer that is observed by an attacker, here CC 1104. The key for encrypting and decrypting the data is only available on TC 1102, which uses the key in TCUMK 1140 and TCUMC 1142.

As previously mentioned, code obfuscation may be used to hide the logic of the original program and may be used in conjunction with data obfuscation. Data obfuscation may be better understood using FIGS. 12-13, and code obfuscation may include, but is not limited to, opcode substitution, function merging, control flow flattening, and decoy code, including opaque predicates.

FIG. 12 illustrates an embodiment computing the sum "g=a+b" using data obfuscation. Trusted Computer 1 (TC1) 1200 selects two random numbers, 'r' and 's', to obfuscate 'a' and 'b' respectively. TC1 1200 computes "a+r" and "b+s" and assigns the results to variables 'c' and 'd', respectively. TC1 1200 then sends (c, d) to Cloud Computer 2 (CC2) 1210. CC2 1210 computes the sum "e=c+d" and requests blinding from Cloud Computer 3 (CC3) 1220. CC3 1220 is given knowledge of random values 'r' and 's' and also a third random value, 'u', used to blind the final result. CC3 1220 computes the value of "u−r−s" and assigns it to variable 'h', which it sends to CC2 1210. CC2 1210 receives the value 'h' from CC3 1220, computes "e+h", and assigns the result to variable which it sends to Trusted Computer 4 (TC4) 1230. TC4 1230 then unblinds the result by computing "f−u", completing the operation. So the TCs 1200 and 1230 use three random numbers, 'r', 's', and 'u', as keys for obfuscating the input data ('a' and 'b') and output data (g') while the two cloud computers 1210 and 1220 compute the actual sum. No cloud computer knows the input or output data.

FIG. 13 illustrates an embodiment computing the product "g=a*b" using data obfuscation. Trusted Computer 1 (TC1) 1300 selects two random numbers, 'r' and 's', to obfuscate 'a' and 'b' respectively. TC1 1300 computes "a*r" and "b*s" and assigns the results to variables 'c' and 'd', respectively. TC1 1300 then sends (c, d) to Cloud Computer 2 (CC2) 1310. CC2 1310 computes the product "e=c*d" and requests blinding from Cloud Computer 3 (CC3) 1320. CC3 1320 is given knowledge of random values 'r' and 's' and also a third random value, 'u', used to blind the final result. CC3 1320 computes the value of "u/(r*s)" and assigns it to variable 'h', which it sends to CC2 1310. CC2 1310 receives the value 'h' from CC3 1320, computes "e*h", and assigns the result to variable which it sends to Trusted Computer 4 (TC4) 1330. TC4 1330 then unblinds the result by computing "f/u", completing the operation. So the TCs 1300 and 1330 use three random numbers, 'r', 's', and 'u', as keys for obfuscating the input data ('a' and 'b') and output data ('g') while the two cloud computers 1310 and 1320 compute the actual product. No cloud computer knows the input or output data.

Opcode substitution involves substituting random opcodes for the real opcodes, thwarting static disassembly of a shred. For a program divided into a series of operations comprising opcodes, a substitution map may be created that maps the program opcodes to a random permutation of opcodes. The substitution map may then be used to transform the series of opcodes into the random permutation of opcodes and sent to a remote computer for use in unobfuscating by the respective other computers. Unobfuscation may be performed by receiving, at the remote computer holding the substitution map, from an other computer, an index corresponding to a portion of the substitution map and sending, from the remote computer to the other computer, the portion of the substitution map. It may be seen symmetrically that an other computer may send, to the remote computer, an index corresponding to a portion of the substitution map, receive, from the remote computer, the portion of the substitution map, and transform, using the substitution map, the random permutation of opcodes into the original series of opcodes.

In an embodiment, opcode substitution with a substitution map may be used with a Java program. Java bytecodes have 256 opcodes, of which 51 opcodes (range 203-253) are not defined. A substitution map is introduced to map the original 256 opcodes to a random permutation of the opcodes. The substitution map is known to the computer that produces a shred as well as to a remote computer, but it is not known to the other computer that executes the shred using the permutated opcodes. The unused opcode 253 is used by the obfuscated programs as a GET MAP instruction. The GET MAP instruction takes a 32-bit index as an operand, which is sent by the other computer executing a shred to the remote computer. The remote computer returns a 256-byte result containing the substitution map to be used for that particular shred. The GET MAP instruction is inserted at the beginning of a shred as well as a user specified number of times within a shred. For security, there should be a large number of GET MAP instructions to thwart statistical analysis of a large section of code that uses the same map. For performance optimization, there should be a small number of GET MAP instructions within loops.

Function merging combines unrelated functions into a single function. The unrelated functions each have parameters and retain their respective behaviors inside the single function. To implement such a scheme, the single function takes all of the unrelated functions' parameters plus an additional parameter to select which behavior to perform. If the number of unrelated functions is large, groups of somewhat-related functions may be merged so that there is a single merged function per group.

Control flow flattening, also known as chenxification, coverts a function into an infinite loop. To exit the loop, a switch statement is added that performs behavior identical to that of the original function.

Decoy code is used to increase the amount of code that an attacker would need to analyze. This may be done by inserting decoy code into the computer program. The decoy code may comprise original code of the computer program with a number of minor mutations. The minor mutations create statically undetectable errors, and the number of minor mutations may be user-specified. The decoy code may be part of an opaque predicate scheme. Such a scheme thwarts static analysis of a function by making the target statement dependent on an opaque predicate, which is a predicate that is easy to setup and execute, but difficult to analyze. Opaque predicates may exploit array aliasing, of which there are three types of predicates: always true, always false, and sometimes true. Always true predicates execute the original code in the "if" branch and decoy code in the "else" branch. Always false predicates execute decoy code in the "if" branch and the original code in the "else" branch. Sometimes true predicates execute the original code and an obfuscated version of the original code on the two branches.

As mentioned previously, FIGS. 14-17 illustrate embodiments using Paillier and El Gamal encryption. For the embodiments in FIGS. 14-17, the following assumptions apply unless stated otherwise. Encryption of message 'm' in Paillier with a public key 'n' is defined as $EP(m)=(n+1)^m r^n \mod n^2$, where 'r' is a random non-zero integer that is less than the public key 'n' and is relatively prime to 'n'. Decryption of cipher 'c' in Paillier with private key (b, u) is defined as $DP(c)=u((c^b \mod n^2-1)/n) \mod n$. Encryption of message 'm' in El Gamal with a public key (n, g, q, h) is defined as $EG(m)=(g^r \mod n, m\ hr \mod n)$, where 'r' is a random non-zero integer less than 'n'. Decryption of cipher (e, c) in El Gamal with private key 'x' is defined as $DG(e, c)=e^{q-x} c \mod n$.

FIG. 14 shows an embodiment of a shredded transition encryption function from Paillier encryption to El Gamal encryption. Decrypt ciphertext 'c' from Paillier and encrypt into El Gamal is defined as:

$$PG(c) =$$
$$\quad \text{let } m = u ((c^b \mod n^2 - 1) / n) \mod n$$
$$\quad \text{in } (g^r \mod n, m\ h^r \mod n)$$

Function "PG(c)" may be shredded into "PG1 (c)", "PG2 (a, c)", and "PG3 (w)" using the following process. Values b1 and b2 are randomly selected such that the sum of b1 and b2 is equal to b (b1+b2=b). Values u1 and u2 are randomly selected such that the product of u1 and u2 is equal to u mod n (u1 *u2=u mod n). The functions are defined as follows:

$$PG1(c) = c^{b1} \mod n^2$$
$$PG2(a, c) =$$
$$\quad \text{let } b = u2 ((a\ c^{b2} \mod n^2) - 1) / n) \mod n$$
$$\quad \text{in } (g^r \mod n, b\ h^r \mod n)$$
$$PG3(w) = u1\ w \mod n$$

Combining the functions yields function "PG_shred(c)":

$$PG\_shred(c) =$$
$$\quad \text{let } a = PG1(c)$$
$$\quad \text{let } (v, w) = PG2(a, c)$$
$$\quad \text{let } z = PG3(w)$$
$$\quad \text{in } (v, z)$$

In FIG. 14, Trusted Computer 1 (TC1) 1400 encrypts message 'm' with public key 'pk' into Paillier ciphertext 'c', which it then sends to Cloud Computer 2 (CC2) 1410. CC2 1410 calculates "PG1 (c)" and assigns the result to 'a', and then sends 'a' and 'c' to Cloud Computer 3 (CC3) 1420. CC3 1420 calculates "PG2 (a, c)" and assigns the result to (v, w), which it sends back to CC2 1410. CC2 1410 calculates "PG3 (w)" and assigns the result to 'z', and then sends (v, z) to Trusted Computer 4 (TC4) 1430. TC4 1430 receives ciphertext (v, z), now in El Gamal encryption, and decrypts it with secret key 'sk' to reveal message 'm'. Neither CC2 1410 nor CC3 1420 know all randomly selected values 'b1', 'b2', 'u1' and 'u2'. In FIG. 14, the public key 'pk', is meant to substitute for 'n', and the secret key 'sk' is meant to substitute for 'x'.

Figure 15:
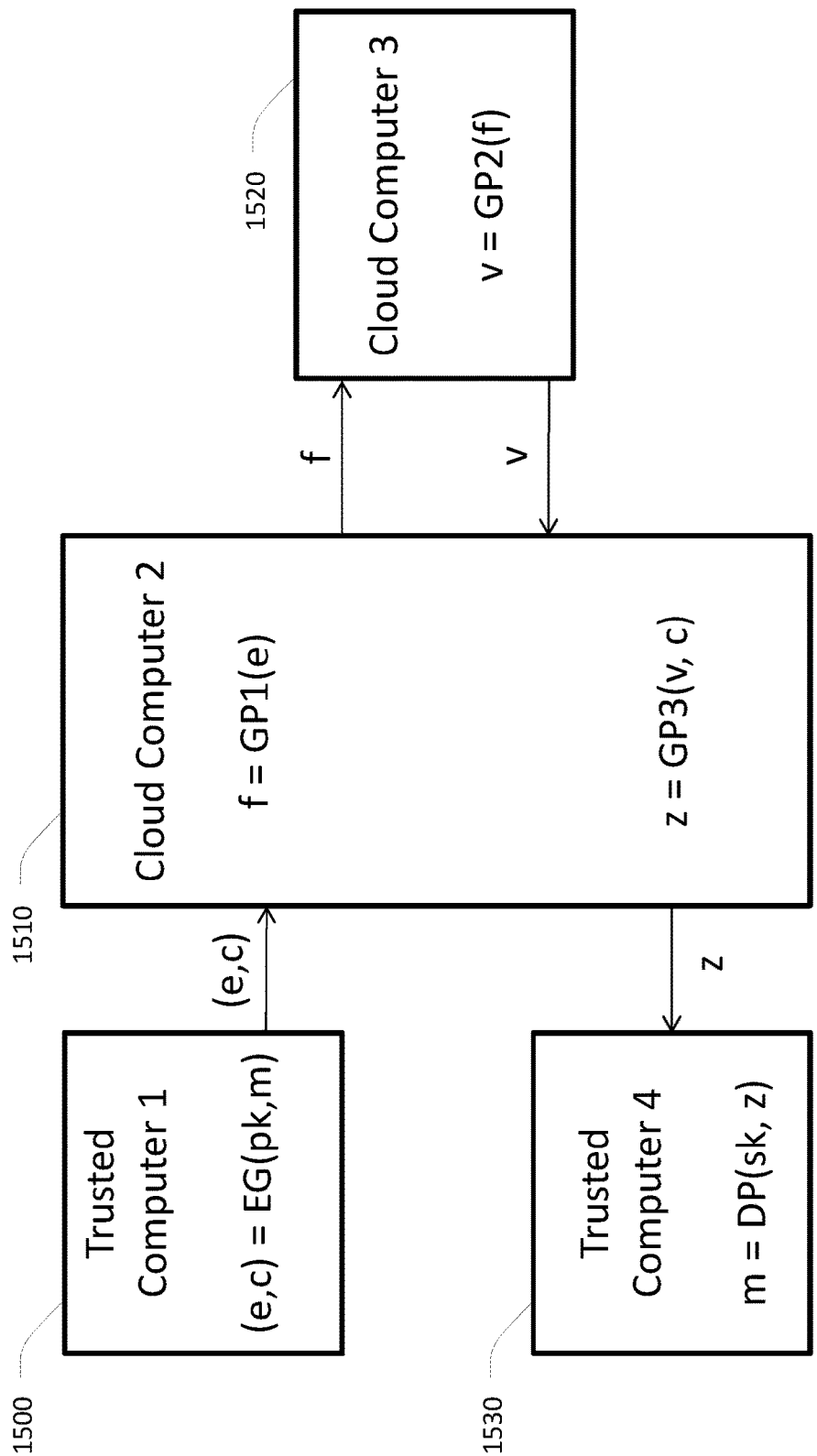
FIG. 15 illustrates an embodiment of the present invention directed to shredding another transition encryption function.
Figure 16:
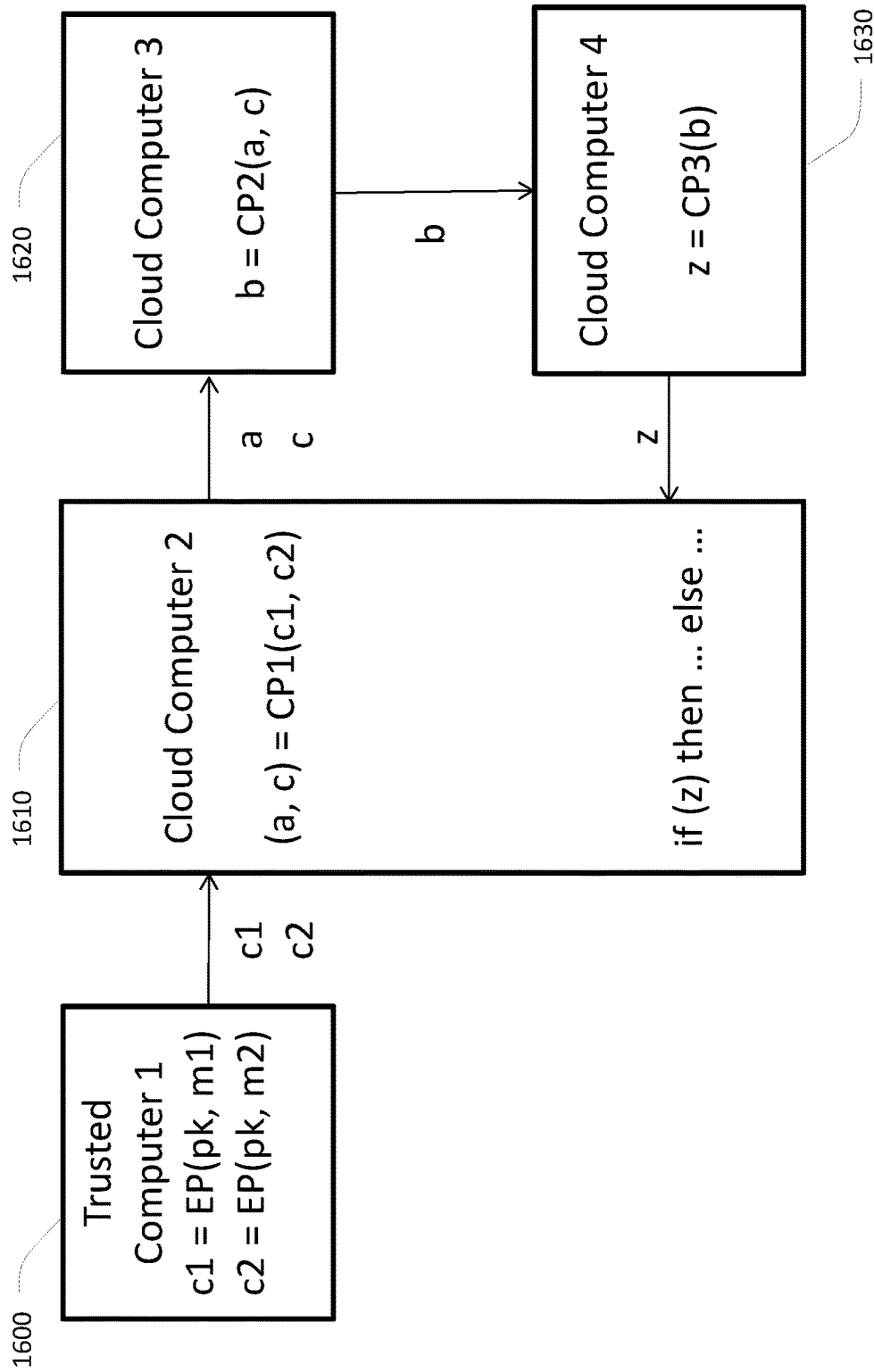
FIG. 16 illustrates an embodiment of the present invention directed to shredding an encrypted comparison operation.

FIG. 15 shows an embodiment of a shredded transition encryption function from El Gamal to Paillier. Decrypt ciphertext (e, c) from El Gamal and encrypt into Paillier is defined as:

$$GP(e, c) =$$
$$\quad \text{let } m = e^{q-x} c \mod n$$
$$\quad \text{in } (n+1)^m r^n \mod n^2$$

Function "GP(e,c)" may be shredded into "GP1 (e)", "GP2 (f)", and "GP3 (v, c)" using the following process. Values x1 and x2 are randomly selected such that the product of x1 and x2 is equal to "q-x" (x1 *x2=q-x). The functions are defined as follows:

$$GP1(e) = e^{x1} \mod n$$
$$GP2(f) =$$
$$\quad \text{let } a = f^{x2} \mod n$$
$$\quad \text{in } (n+1)^a \mod n^2$$
$$GP3(v, c) =$$
$$\quad \text{let } w = v^c \mod n^2$$
$$\quad \text{in } w\ r^n \mod n^2$$

Combining the functions yields function "GP_shred(e, c)":

$$\begin{aligned}&\text{GP\_shred(e, c)} =\\&\quad\text{let } f = \text{GP1(e)}\\&\quad\text{let } v = \text{GP2(f)}\\&\quad\text{in GP3(v, c)}\end{aligned}$$

In FIG. 15, Trusted Computer 1 (TC1) 1500 encrypts message 'm' with public key 'pk' into El Gamal ciphertext (e,c), which it then sends to Cloud Computer 2 (CC2) 1510. CC2 1510 calculates "GP1 (e)" and assigns the result to and then sends 'f' to Cloud Computer 3 (CC3) 1520. CC3 1520 calculates "GP2 (f)" and assigns the result to 'v', which it sends back to CC2 1510. CC2 1510 calculates "GP3 (v, c)" and assigns the result to 'z', and then sends 'z' to Trusted Computer 4 (TC4) 1530. TC4 1530 receives ciphertext 'z', now in Paillier encryption, and decrypts it with secret key 'sk' to reveal message 'm'. Neither CC2 1510 nor CC3 1520 know both randomly selected values 'x1' and 'x2'. In FIG. 15, the public key 'pk', is meant to substitute for (n, g, q, h), and the secret key 'sk' is meant to substitute for (b, u).

FIG. 16 shows an embodiment of a shredded comparison function using Paillier encryption. If two integers (both less than n/2, where n is the public key) are encrypted in the Paillier scheme, order comparison between them may be defined as follows:

$$\begin{aligned}&\text{CP}(c_1, c_2) =\\&\quad\text{let } c_3 = \text{invert } c_2 \bmod n^2\\&\quad\text{let } c = c_1\, c_3 \bmod n^2\\&\quad\text{let } d = u\, ((c^b \bmod n^2 - 1)\, /\, n) \bmod n\\&\quad\text{in}\\&\quad\quad\text{if } d = 0 \text{ then EQ}\\&\quad\quad\text{else if } d < n/2 \text{ then GT}\\&\quad\quad\text{else LT}\end{aligned}$$

where "EQ" means "$c_1 = c_2$", "GT" means "$c_1 > c_2$", and "LT" means "$c_1 < c_2$". Note that 'c' is the encrypted difference between '$c_1$' and '$c_2$' and 'd' is the decrypted difference between '$c_1$' and '$c_2$'. Function "CP($c_1, c_2$)" may be shredded into "CP1 ($c_1, c_2$)", "CP2 (a, c)", and "CP3 (b)" using the following process. Values b1 and b2 are randomly selected such that the sum of b1 and b2 is equal to b (b1+b2=b). Values u1 and u2 are randomly selected such that the product of u1 and u2 is equal to u mod n (u1 *u2=u mod n). The functions are defined as follows:

$$\begin{aligned}&\text{CP1}(c_1, c_2) =\\&\quad\text{let } c_3 = \text{invert } c_2 \bmod n^2\\&\quad\text{let } c = c_1\, c_3 \bmod n^2\\&\quad\text{let } a = c^{b1} \bmod n^2\\&\quad\text{in (a, c)}\\&\text{CP2(a, c)} =\\&\quad\text{let } b = u2\, ((a\, c^{b2} \bmod n^2) - 1)\, /\, n) \bmod n\\&\quad\text{in CP3(b)}\\&\text{CP3(b)} =\\&\quad\text{let } d = u1\, b \bmod n\\&\quad\text{in}\\&\quad\quad\text{if } d = 0 \text{ then EQ}\\&\quad\quad\text{else if } d < n/2 \text{ then GT}\\&\quad\quad\text{else LT}\end{aligned}$$

Combining the functions yields function "CP_shred($c_1, c_2$)":

$$\begin{aligned}&\text{CP\_shred}(c_1, c_2) =\\&\quad\text{let (a, c)} = \text{CP1}(c_1, c_2)\end{aligned}$$

$$\begin{aligned}&\quad\text{let } b = \text{CP2 (a, c)}\\&\quad\text{in CP3(b)}\end{aligned}$$

In FIG. 16, Trusted Computer 1 (TC1) 1600 encrypts message 'm1' with public key 'pk' into Paillier ciphertext 'c1' and message 'm2' with public key 'pk' into Paillier ciphertext 'c2'. TC1 1600 then sends ($c_1, c_2$) to Cloud Computer 2 (CC2) 1610. CC2 1610 calculates "CP1 ($c_1, c_2$)" and assigns the result to (a, c), and then sends (a, c) to Cloud Computer 3 (CC3) 1620. CC3 1620 calculates "CP2 (a, c)" and assigns the result to 'b', which it sends to Cloud Computer 4 (CC4) 1630. CC4 1630 calculates "CP3 (b)" and assigns the result to 'z', and then sends 'z' to CC2 1610. CC2 1610 receives 'z', and performs the conditionals to determine "EQ", "GT", or "LT", which may then be used for further calculations. No cloud computer knows all randomly selected values 'b1', 'b2', 'u1' and 'u2'. In FIG. 16, the public key 'pk', is meant to substitute for 'n'.

Figure 17:
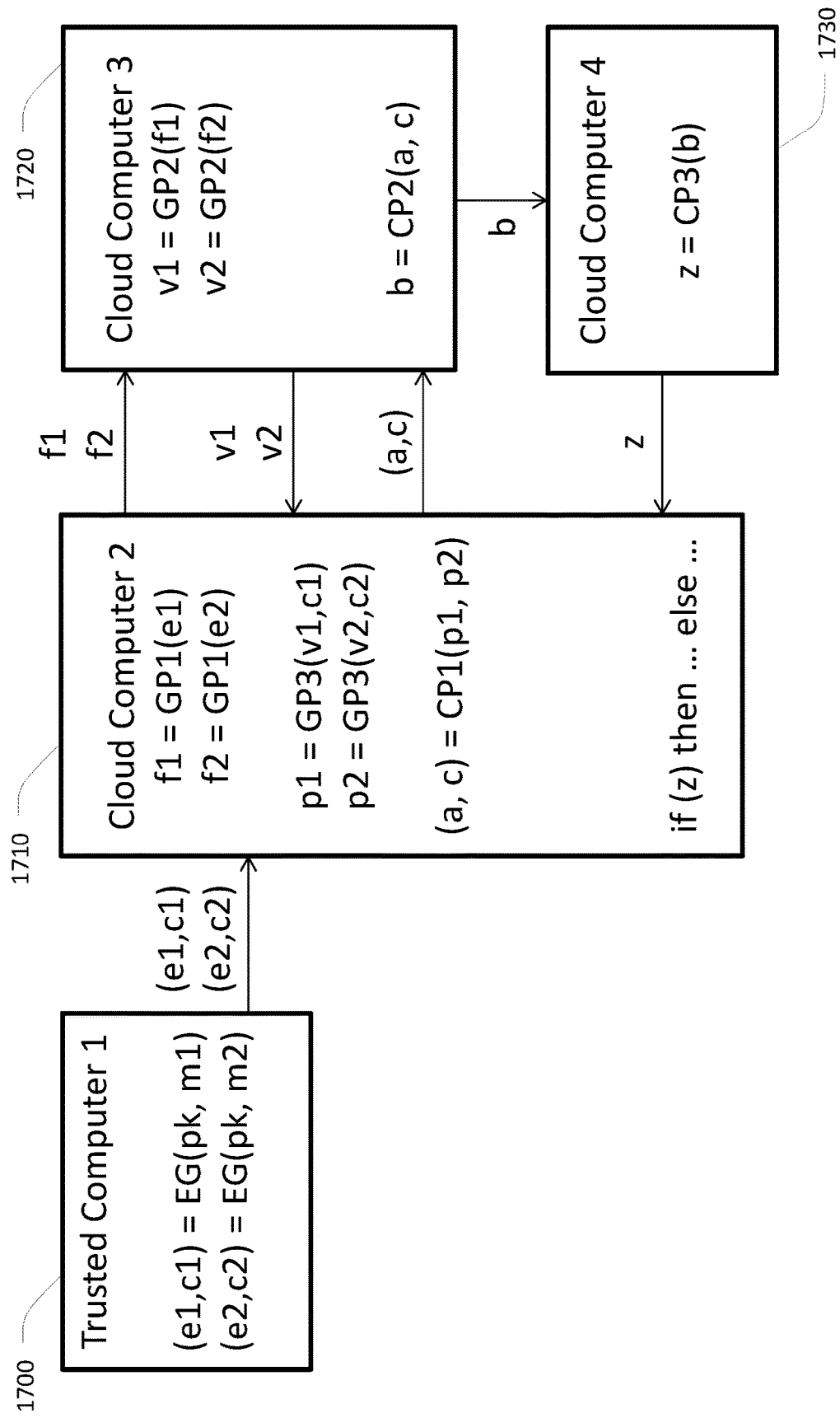
FIG. 17 illustrates an embodiment of the present invention directed to shredding another encrypted comparison operation.

FIG. 17 shows an embodiment of a shredded comparison function using El Gamal encryption. If two integers (both less than n/2, where n is the public key) are encrypted in the El Gamal scheme, order comparison between them may be defined as follows:

$$\begin{aligned}&\text{CG}((e_1, c_1), (e_2, c_2)) =\\&\quad\text{let } p_1 = \text{GP}(e_1, c_1)\\&\quad\text{let } p_2 = \text{GP}(e_2, c_2)\\&\quad\text{in CP}(p_1, p_2)\end{aligned}$$

where "GP( )" is the El Gamal-to-Paillier transition function defined in FIG. 15 and "CP( )" is the Paillier comparison function defined in FIG. 16. Function "CG(($e_1, c_1$), ($e_2, c_2$))" may be shredded as follows:

$$\begin{aligned}&\text{CG\_shred}((e_1, c_1), (e_2, c_2)) =\\&\quad\text{let } p_1 = \text{GP\_shred}(e_1, c_1)\\&\quad\text{let } p_2 = \text{GP\_shred}(e_2, c_2)\\&\quad\text{in CP\_shred}(p_1, p_2)\end{aligned}$$

In FIG. 17, Trusted Computer 1 (TC1) 1700 encrypts message 'm1' with public key 'pk' into El Gamal ciphertext (e1, c1) and message 'm2' with public key 'pk' into El Gamal ciphertext (e2, c2). TC1 1700 then sends (e1, c1) and (e2, c2) to Cloud Computer 2 (CC2) 1710. CC2 1710 calculates "GP1 (e1)" and assigns the result to 'f1' and "GP1 (e2)" and assigns the result to 'f2', and then sends 'f1' and 'f2' to Cloud Computer 3 (CC3) 1720. CC3 1720 calculates "GP2 (f1)" and assigns the result to 'v1' and "GP2 (f2)" and assigns the result to 'v2', and then sends 'v 1' and 'v2' back to CC2 1710. CC2 1710 calculates "GP3 (v1, c1)" and assigns the result to 'p1' and "GP3 (v2, c2)" and assigns the result to 'p2'. CC2 1710 calculates "CP1 (p1, p2)" and assigns the result to (a, c), and then sends (a, c) to Cloud Computer 3 (CC3) 1720. CC3 1720 calculates "CP2(a, c)" and assigns the result to 'b', which it sends to Cloud Computer 4 (CC4) 1730. CC4 1730 calculates "CP3 (b)" and assigns the result to 'z', and then sends 'z' to CC2 1710. CC2 1710 receives 'z', and performs the conditionals to determine "EQ", "GT", or "LT", which may then be used for further calculations. No cloud computer knows all randomly selected values. In FIG. 17, the public key 'pk', is meant to substitute for (n, g, q, h).

Figure 19:
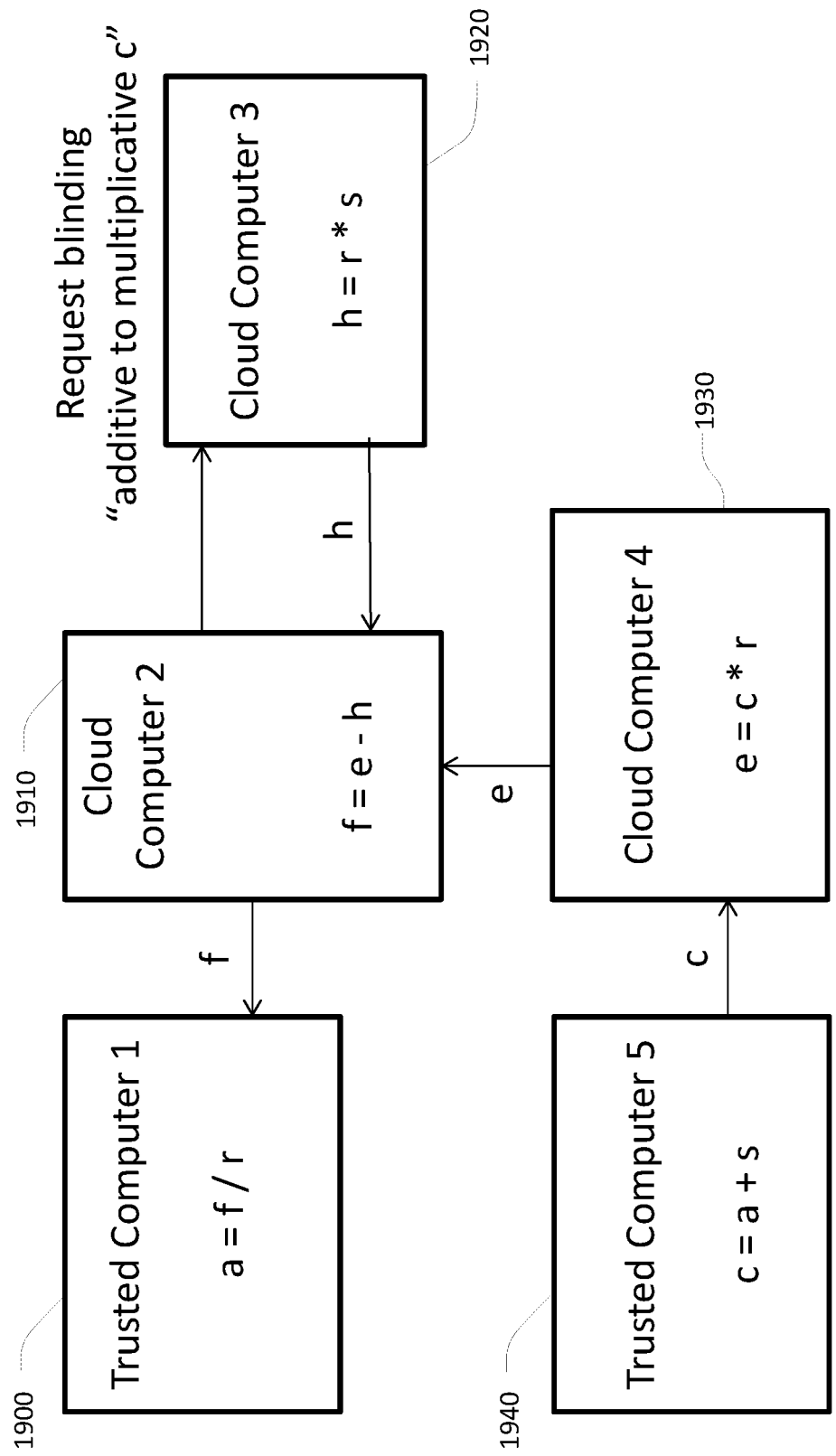
FIG. 19 illustrates an embodiment of the present invention directed to shredding another mathematical obfuscation transition function.

As mentioned previously, some embodiments of shredding and obfuscating a mathematical operation might require transitioning an operation from a multiplicative obfuscation scheme to an additive multiplication scheme and vice versa. FIGS. 18-19 illustrate two example embodiments of these transition functions.

FIG. 18 illustrates an embodiment transitioning from a multiplicative obfuscation scheme to an additive obfuscation scheme. In this example embodiment, the program performs multiplicative blinding of 'a' with a random number but needs the additive blinding of 'a' with a random number 's'. The transition process is shredded for security. First, Trusted Computer 1 (TC1) 1800 and Trusted Computer 5 (TC5) 1840 select two random numbers, 'r' and 's', to blind 'a'. TC1 1800 computes "a*r" and assigns the result to variable 'c', which it then sends to Cloud Computer 2 (CC2) 1810. CC2 1810 requests multiplicative to additive blinding from Cloud Computer 3 (CC3) 1820. CC3 1820 is given knowledge of random values 'r' and 's', and computes "r*s", assigns the product to variable 'h', and sends 'h' to CC2 1810. CC2 1810 receives the value 'h' from CC3 1820, computes "c+h", and assigns the result to variable 'e', which it sends to Cloud Computer 4 (CC4) 1830. CC4 1830 then unblinds the product by computing "e/r", which it assigns to variable 'f', and sends 'f' to TC5 1840. Finally, TC5 1840 receives the additively-blinded value of a, which equals "a+s". The variable 'a' may be recovered by subtracting 's' from T.

FIG. 19 illustrates an embodiment transitioning from an additive obfuscation scheme to a multiplicative obfuscation scheme. The process is essentially the reverse process of that illustrated in FIG. 18. Note that, in order to keep the random seeds from being dispersed to more than the necessary computers, the arrows follow a reverse path from that of FIG. 18. In this manner for either transition, only the TCs (1800, 1840, 1900, and 1940) and CC3 (1820 and 1920) would know both seeds, CC2 (1810 and 1910) would not know any seed, and CC4 (1830 and 1930) would know only the multiplicative seed.

In the example embodiment of FIG. 19, the program performs additive blinding of 'a' with a random number 's', but needs the multiplicative blinding of 'a' with a random number 'r'. The transition process is shredded for security. First, Trusted Computer 1 (TC1) 1900 and Trusted Computer 5 (TC5) 1940 select two random numbers, 'r' and 's', to blind 'a'. TC5 1940 computes "a+s" and assigns the result to variable 'c', which it then sends to Cloud Computer 4 (CC4) 1930. CC4 1930 then blinds the sum by computing "c*r", which it assigns to variable 'e', and sends 'e' to Cloud Computer 2 (CC2) 1910. CC2 1910 requests additive to multiplicative blinding from Cloud Computer 3 (CC3) 1920. CC3 1920 is given knowledge of random values 'r' and 's', and computes "r*s", assigns the product to variable 'h', and sends 'h' to CC2 1910. CC2 1910 receives the value 'h' from CC3 1920, computes "e−h", and assigns the result to variable 'f', which it sends to TC1 1900. Finally, TC1 1900 receives the multiplicatively-blinded value of a, which equals "a*r". The variable 'a' may be recovered by computing "f/r".

Shredding of the conversion from one blinding scheme to another, as illustrated in FIGS. 18-19, is used so that the plain value of 'a' cannot be computed by an attacker controlling any single cloud computer. During the shredded conversion, the multiplicative key 'r' is exposed to CC4 (1830 and 1930), but an attacker at this computer only sees the additively blinded value of 'a'. Similarly, although an attacker at CC2 (1810 and 1910) sees the multiplicatively blinded value of 'a', the lack of access to the multiplicative blinding key 'r' prevents computation of 'a'. Although both keys 'r' and 's' are exposed at CC3 (1820 and 1920), this computer only serves the product "r*s", and an attacker at CC3 (1820 and 1920) never sees either the additively blinded or multiplicatively blinded value of 'a'.

The above methods and processes (Method I) are effective against attackers with root access to a single other computer that record and analyze the executed programs, the in-memory data, and the files on disk to observe private information (Threat Level I). However, Method I may not be effective against an attacker that can modify the executing programs, memory, and files on the single other computer to disrupt execution (Threat Level II). To account for this, the above may be extended so that every shred is executed on multiple other computers (Method II). The intermediate data results from the multiple other computers would be checked for consistency, and computation is aborted if an inconsistency is detected. As long as the attacker does not gain control of all other computers that execute a particular shred, Method II is able to thwart attacks from an attacker at Threat Level II. Further, neither Method I nor Method II is effective against an attacker that controls all of the other computers in a network (Threat Level III). Method II may be extended so that the other computers chosen for executing a single program span multiple administrative domains or multiple commercially distinct infrastructures (Method III). For example, the other computers may be chosen from different public cloud providers such as Google, Amazon, and/or Microsoft. As long as an attacker does not gain control of all of the domains or infrastructures chosen for a program, Method III is able to thwart attacks from an attacker at Threat Level III.

Privacy offered by the above methods and processes stems from the shredding of computation and data. The obfuscation and encryption operations add some overhead to the execution latency, but the main contribution to performance degradation is due to the communication latency of the network between the computers. Hence, it is important to minimize the number of messages as well as the size of the messages sent between the various computers involved.

The disclosures of each patent, patent application, and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed:

1. A method for executing an executable computer program, the computer program residing on a trusted computer, the trusted computer being connected to at least one other computer, the method comprising:

dividing an executable computer program into a series of operations, the operations comprising circuit gate operations or computer arithmetic operations, and the operations each comprising an operator, a first operand, and a second operand;

obfuscating each operation of the series of operations by obfuscating the first operand with a first random value and obfuscating the second operand with a second random value;

sending, for remote execution of the executable computer program, the obfuscated operations with accompanying instructions to the at least one other computer, the accompanying instructions operative to:
compute a respective result of each of the obfuscated operations; and
forward an obfuscated computed outcome of the executable computer program to the trusted computer;
the method further comprising:
receiving, at the trusted computer, the obfuscated computed outcome of the executable computer program; and
unobfuscating the received obfuscated computed outcome of the executable computer program.

2. The method of claim 1, the operations are circuit gate operations, and wherein the sending each operation of the series of operations with accompanying instructions to at least one other computer comprises:
sending the obfuscated operands to a first computer with instructions comprising:
computing a plurality of results of a plurality of operations using the obfuscated operands; and
sending the plurality of results to a second computer;
sending instructions to the second computer comprising:
choosing a result of the plurality of results based upon the operator, the first random value, and the second random value;
obfuscating the chosen result with a third random value; and
sending the chosen result to a different computer.

3. The method of claim 1, wherein the operations are computer arithmetic operations, and wherein the sending each operation of the series of operations with accompanying instructions to at least one other computer comprises:
sending the operator and obfuscated operands to a first computer with instructions comprising:
computing a first result of an operation using the operator, the first obfuscated operand, and the second obfuscated operand;
receiving a value from a second computer;
computing a second result of an operation using the operator, the first result, and the value; and
sending the second result to a different computer.

4. The method of claim 1, wherein the obfuscation scheme of the first operand does not match the obfuscation scheme of the second operand.

5. The method of claim 4, wherein a transition obfuscation function is used to convert the obfuscation scheme of the first operand to the obfuscation scheme of the second operand using a third random value.

6. The method of claim 5, further comprising:
dividing the transition obfuscation function into a series of operations; and
sending each operation of the transition obfuscation function with accompanying instructions to at least one other computer, the accompanying instructions operative to compute a result of the respective operation and forward the result to another computer.

7. The method of claim 6, wherein the sending each operation of the transition obfuscation function with accompanying instructions to at least one other computer comprises:
if the first operand is multiplicatively obfuscated:
sending the obfuscated operand to a first computer with instructions comprising:
receiving a value from a second computer;
computing a sum of the first obfuscated operand and the value; and
sending the sum to a third computer;
sending instructions to the third computer comprising:
computing the quotient of the sum and the first random value; and
sending the quotient to a different computer;
if the first operand is additively obfuscated:
sending the obfuscated operand to a third computer with instructions comprising:
computing a product of the first obfuscated operand and the third random value; and
sending the product to a first computer;
sending instructions to the first computer comprising:
receiving a value from a second computer;
computing a difference between the product and the value; and
sending the difference to a different computer.

8. The method of claim 7, wherein the value received from the second computer is the product of the first random value and the third random value.

9. The method of claim 1, wherein the obfuscating comprises code obfuscation, data obfuscation, or both.

10. The method of claim 1, wherein the at least one other computer is part of a cloud.

11. The method of claim 10, wherein the cloud is untrusted.

12. The method of claim 10, wherein the cloud spans multiple administrative domains.

13. The method of claim 10, wherein the cloud spans multiple commercially distinct infrastructures.

14. The method of claim 1, wherein the at least one other computer is part of an enterprise network.

15. The method of claim 1, wherein the at least one other computer is randomly selected from a plurality of computers.

16. The method of claim 15, wherein each computer of the plurality of computers is untrusted.

17. The method of claim 1, wherein the at least one other computer is untrusted.

18. The method of claim 1, wherein the at least one other computer is not the trusted computer.

19. The method of claim 1, wherein the trusted computer comprises one or more virtual machines.

20. The method of claim 1, wherein the at least one other computer comprises one or more virtual machines.

21. The method of claim 1, wherein the another computer comprises one or more virtual machines.

22. The method of claim 1, wherein the sending each operation of the series of operations with accompanying instructions to the at least one other computer comprises sending each operation to multiple computers for computation.

23. A system comprising:
at least one trusted computer communicatively connected to at least one other computer, a first trusted computer of the at least one trusted computer having stored thereon computer instructions that during execution cause the system to perform operations comprising:
dividing an executable computer program into a series of operations, the operations comprising circuit gate operations or computer arithmetic operations, the operations each comprising an operator, a first operand, and a second operand, and the executable computer program being on the first trusted computer;
obfuscating each operation of the series of operations by obfuscating the first operand with a first random value and obfuscating the second operand with a second random value;

sending, for remote execution of the executable computer program, the obfuscated operations with accompanying instructions to the at least one other computer, the accompanying instructions operative to:
compute a respective result of each of the obfuscated operations; and
forward an obfuscated computed outcome of the executable computer program to the first trusted computer;
receiving, at the first trusted computer, the obfuscated computed outcome of the executable computer program; and
unobfuscating the received obfuscated computed outcome of the executable computer program.

24. The system of claim 23, wherein the series of operations are circuit gate operations, and wherein the sending each operation of the series of operations with accompanying instructions to at least one other computer comprises:
sending the obfuscated operands to a first computer with instructions comprising:
computing a plurality of results of a plurality of operations using the obfuscated operands; and
sending the plurality of results to a second computer;
sending instructions to the second computer comprising:
choosing a result of the plurality of results based upon the operator, the first random value, and the second random value;
obfuscating the chosen result with a third random value; and
sending the chosen result to a different computer.

25. The system of claim 23, wherein the series of operations are computer arithmetic operations.

26. The system of claim 23, wherein each operation of the series of operations corresponds to an operation performed by a hardware unit.

27. The system of claim 26, further comprising an integer adder on the at least one other computer.

28. The system of claim 26, further comprising an integer multiplier on the at least one other computer.

29. The system of claim 26, further comprising an integer comparator on the at least one other computer.

30. The system of claim 26, further comprising a floating point multiplier on the at least one other computer.

31. The system of claim 25, wherein the sending each operation of the series of operations with accompanying instructions to at least one other computer comprises:
sending the operator and obfuscated operands to a first computer with instructions comprising:
computing a first result of an operation using the operator, the first obfuscated operand, and the second obfuscated operand;
receiving a value from a second computer;
computing a second result of an operation using the operator, the first result, and the value; and
sending the second result to a different computer.

32. The system of claim 23, wherein the obfuscation scheme of the first operand does not match the obfuscation scheme of the second operand.

33. The system of claim 32, wherein a transition obfuscation function is used to convert the obfuscation scheme of the first operand to the obfuscation scheme of the second operand using a third random value.

34. The system of claim 33, the at least one trusted computer having stored thereon computer instructions that during execution cause the system to perform operations further comprising:
dividing the transition obfuscation function into a series of operations; and
sending each operation of the transition obfuscation function with accompanying instructions to at least one other computer, the accompanying instructions operative to compute a result of the respective operation and forward the result to another computer.

35. The system of claim 34, wherein the sending each operation of the transition obfuscation function with accompanying instructions to at least one other computer comprises:
if the first operand is multiplicatively obfuscated:
sending the obfuscated operand to a first computer with instructions comprising:
receiving a value from a second computer;
computing a sum of the first obfuscated operand and the value; and
sending the sum to a third computer;
sending instructions to the third computer comprising:
computing the quotient of the sum and the first random value; and
sending the quotient to a different computer;
if the first operand is additively obfuscated:
sending the obfuscated operand to a third computer with instructions comprising:
computing a product of the first obfuscated operand and the third random value; and
sending the product to a first computer;
sending instructions to the first computer comprising:
receiving a value from a second computer;
computing a difference between the product and the value; and
sending the difference to a different computer.

36. The system of claim 35, wherein the value received from the second computer is the product of the first random value and the third random value.

37. The system of claim 23, wherein the obfuscating comprises code obfuscation, data obfuscation, or both.

38. The system of claim 23, wherein the at least one other computer is part of a cloud.

39. The system of claim 38, wherein the cloud is untrusted.

40. The system of claim 38, wherein the cloud spans multiple administrative domains.

41. The system of claim 38, wherein the cloud spans multiple commercially distinct infrastructures.

42. The system of claim 23, wherein the at least one other computer is part of an enterprise network.

43. The system of claim 23, wherein the at least one other computer is randomly selected from a plurality of computers.

44. The system of claim 43, wherein each computer of the plurality of computers is untrusted.

45. The system of claim 23, wherein the at least one other computer is untrusted.

46. The system of claim 23, wherein the at least one other computer is not the trusted computer.

47. The system of claim 23, wherein the trusted computer comprises one or more virtual machines.

48. The system of claim 23, wherein the at least one other computer comprises one or more virtual machines.

49. The system of claim 23, wherein the another computer comprises one or more virtual machines.

50. The system of claim 23, wherein the sending each operation of the series of operations with accompanying instructions to the at least one other computer comprises sending each operation to multiple computers for computation.

* * * * *